United States Patent [19]

Oyokota et al.

[11] 4,417,793
[45] Nov. 29, 1983

[54] CAMERA CAPABLE OF FUNCTIONING IN ACCORDANCE WITH INFORMATIONS RECEIVED FROM A ROLL OF FILM

[75] Inventors: Shigeru Oyokota; Nobuyuki Taniguchi; Takeo Hoda; Junichi Tanii; Kiyoshi Seigenji, all of Sakai; Toshiaki Matsumoto, Izumisano, all of Japan

[73] Assignee: Minolta Camera Kabushiki Kaisha, Osaka, Japan

[21] Appl. No.: 342,594

[22] Filed: Jan. 25, 1982

[30] Foreign Application Priority Data

Jan. 28, 1981 [JP] Japan .................................. 56-11301

[51] Int. Cl.³ ........................ G03B 1/66; G03B 17/36; G01N 21/86; B65H 25/00
[52] U.S. Cl. .................................... 354/21; 354/173; 354/214; 354/217; 250/559; 226/45
[58] Field of Search .................... 354/21, 22, 23 R, 28, 354/37, 41, 58, 171, 173, 212, 215, 214, 217, 218, 289, 275; 352/78 C, 92; 226/45; 242/186, 188, 71.4, 71.5, 71.6; 353/26 R, 26 A, 120; 250/555–557, 559, 566, 568, 570; 235/453, 474, 475, 476, 441–443, 446, 92 T, 92 TF, 92 FQ, 92 PB, 92 DE; 355/41

[56] References Cited

U.S. PATENT DOCUMENTS

| | | | |
|---|---|---|---|
| 2,994,783 | 8/1961 | Looschen | 250/557 X |
| 3,485,157 | 12/1969 | Nerwin | 95/31 |
| 3,541,339 | 11/1970 | St. John et al. | 250/557 |
| 4,200,371 | 4/1980 | Suzuki et al. | 354/21 |
| 4,294,527 | 10/1981 | Hashimoto et al. | 354/25 |
| 4,299,466 | 11/1981 | Harvey | 354/173 |

FOREIGN PATENT DOCUMENTS 53-11020 2/1978 Japan .
54-26722 2/1979 Japan .
54-70031 6/1979 Japan .

OTHER PUBLICATIONS

Research Disclosure, Apr. 1980, No. 192, p. 142.

Primary Examiner—William B. Perkey
Attorney, Agent, or Firm—Watson, Cole, Grindle & Watson

[57] ABSTRACT

A camera capable of functioning in accordance with informations received from a roll of film, and is provided with circuitry for generating first and second electric signals each changing in response to respective passages of the sprocket holes with a time lag provided between the changes in the first and second electric signals, with the sprocket hole signal indicative of the passage of sprocket holes being formed in response to the first and second electric signa 16 Claims, 32 Drawing Figures

CAMERA CAPABLE OF FUNCTIONING IN ACCORDANCE WITH INFORMATIONS RECEIVED FROM A ROLL OF FILM

BACKGROUND OF THE INVENTION

The present invention generally relates to photography and more particularly, to a photographic camera capable of functioning in accordance with information received from a roll of film to be loaded in the camera.

Various information are expected to be received from a roll of film to be loaded in the camera. For example, a series of signals formed by detecting the passages of the sprocket holes of the film may be information of the amount of movement of the film which is being wound up, and code signals located on the film surface or the film catridge are also useful information to be received from the film. The camera can function in accordance with such information in various ways, i.e. the camera is capable of indicating the frame number of the film by counting the series of signals formed by detecting the passage of the sprocket holes, and the camera is capable of automatically winding-up the film to the first frame or sensing that the film has been wound-up to the last frame by counting the sprocket hole signals. Further, the code signal received by the camera can inform the camera of the number of available frame of the loaded film, or the position of the first frame or the last frame.

The prior art has proposed various camera relating to the above mentioned camera functions, such as disclosed in U.S. Pat. Nos. 3,485,157 and 4,294,527; Research Disclosure, April 1980, Number 192, page 142, and Japanese Laid Open Patent Application Nos. 54/26722 and 54/70031.

As to the detection of the passages of the sprocket holes, the prior art conventionally proposes various arrangements for detecting film sprocket holes, through detection of electrical conduction or non-conduction according to the presence or absence of the film sprocket holes by the employment of switch means and the like, for example, in photographic cameras.

The known film sprocket hole detecting arrangements as described above, however, are inevitably accompanied by the so-called chattering or generation of vibration noises at electrical contact portions thereof, and if the chattering as described above is left as it is, there are such disadvantages that, for example, in a case where the number of frames of the film which have been exposed is to be counted by the signal from the electrical contact portions, false counting of more than two sprocket holes may undesirably occur, in spite of the fact that only one sprocket hole has passed through the detecting portion. In order to overcome the disadvantages as described above, there have conventionally been proposed various arrangements in which chattering elimination circuits are provided in the detecting portions. However, the known chattering elimination circuits as described above are fundamentally arranged to remove high frequency components of signals for producing only low frequency components, and have such a drawback that the response thereof tends to be slow. More specifically, when the winding speed of the film is increased, there arises such a problem that the detection signal is not produced due to a delay in the response of the chattering elimination circuit in spite of the detection of sprocket holes. Moreover, there are cases where contact pieces for the chattering elimination circuit are subjected to bounding at a period much larger than that of the chattering even after settling of the chattering, due to adhesion of dust and dirt thereto or fatigue of the contact pieces. However, it is impossible for the chattering elimination circuit to remove such undesirable signals arising from the bounding at the contact pieces.

Furthermore, in the case where the film, for example, in the form of a roll is arranged to be wound by a motor, the roll of film may be wound up at least by one frame without stopping in the course of winding, but in the case of manual winding, the roll of film is not necessarily wound up continuously all through one frame, but may be fed intermittently or suspended in its winding-up in some cases. In the cases as described above, if starting of generation or signal output of the sprocket hole detecting signal disappears, with simultaneous interruption of the manual advancing of the film, in the course of film feeding at which the film equivalent to one frame has not completely been advanced, the output for the sprocket hole detection signal is in an unstable state at which time, a large number of sprocket hole detection signals are undesirably developed even by a slight external impact applied to the camera. The abnormal sprocket hole detection signals as described above can not be corrected by the known chattering elimination circuits, and thus, it becomes difficult to correctly effect the counting of the frames which have been exposed for photographing.

Further, with respect to the camera designed to function in response to the code signals representative of the number of the available frames, or the position of the first or last frame of the film, the prior art fails to consider how to deal with a case that a film without such code signals is loaded in the camera.

SUMMARY OF THE INVENTION

Accordingly, an object of the present invention is to provide a camera with a film sprocket hole detecting arrangement, which is adapted to correctly detect an amount of displacement or displaced position of the film in an efficient manner, with substantial elimination of the disadvantages inherent in the conventional arrangements of this kind.

Another object of the present invention is to provide a camera with a film sprocket hole detecting arrangement of the above described type which is simple in construction and accurate in functioning at high reliability, and can be readily incorporated into photographic cameras and the like at low cost.

A further object of the present invention is to provide a camera capable of functioning regardless of whether a film with the code signal or a film without the code signal is loaded.

According to a feature of the present invention, means for generating first and second electric signals each changing in response to respective passages of the sprocket holes with a time lag provided between the changes in the first and second electric signals is provided, and the sprocket hole signal indicative of the passage of sprocket holes is formed in response to the first and second electric signals.

According to another feature of the present invention, the camera is provided with means for dealing with both a film with the code signal and a film without the code signal.

According to still another feature of the present invention, the changes in the sprocket hole signal are counted in dealing with a film without the code signal.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals and symbols throughout several views of the accompanying drawings.

DETAILED DESCRIPTION OF THE INVENTION

Figure 1:
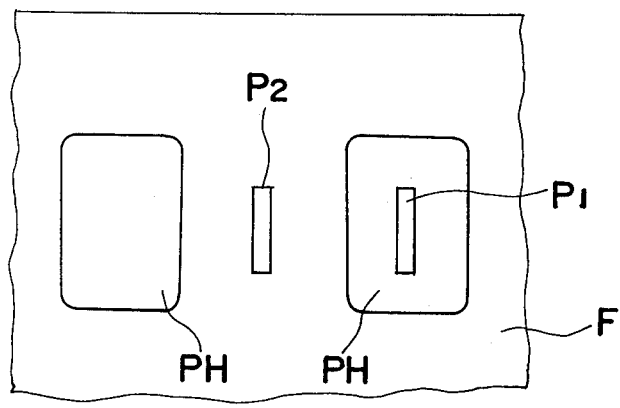
FIG. 1 is a fragmentary top plan view of a photographic film showing, on an enlarged scale, the relation between film sprocket holes and sprocket hole detecting portions for explaining the fundamental construction of a film sprocket hole detecting arrangement according to a first embodiment of the present invention.

Referring now to the drawings, there is shown in FIG. 1 a fragmentary top plan view of a photographic film F, for example, in the form of 35 mm roll film illustrating a fundamental construction of a film sprocket hole detecting arrangement according to one preferred embodiment of the present invention. In FIG. 1, the sprocket hole detecting arrangement includes detecting portions P1 and P2 which are, as will be described later in more detailed manner, so disposed at the side of a photographic camera that, when the detecting portion P1 is in a position to detect the sprocket hole PH, i.e. within said sprocket hole, the detecting portion P2 is located in a position not to detect the sprocket hole PH, i.e. out of said sprocket hole, while, when the detecting portion P2 is located within the sprocket hole PH for detection thereof, the detecting portion P1 is located out of the sprocket hole PH so as not to detect said sprocket hole PH.

Figure 2:
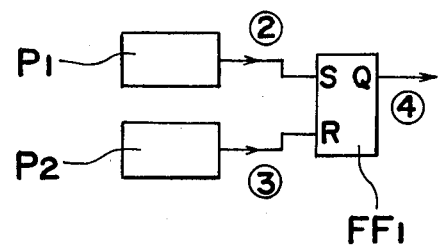
FIG. 2 is an electrical block diagram of a circuit for producing the sprocket hole signal in response to the sprocket hole detecting portions of FIG. 1.
Figure 3:
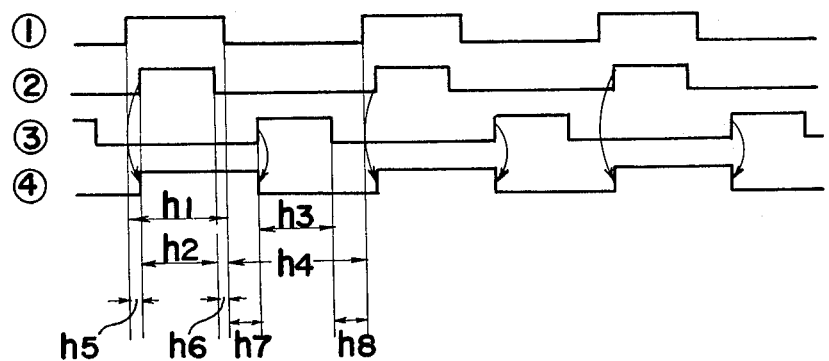
FIG. 3 is a time chart explanatory of the functions of the circuit in FIG. 2, FIGS. 4(a) and 4(b) are fragmentary sectional views taken in lateral and longitudinal directions of a photographic camera to which the film sprocket hole detecting arrangement according to one specific construction of the first embodiment is applied.

In a time-chart of FIG. 3 for explaining functions of the detecting portions as described above, the sprocket hole PH is represented by a symbol ①, with the width and interval thereof being set, for example, to h1=2.0 mm, h4=2.8 mm, and the output of the detecting portion P1 in FIG. 2 represented by a symbol ② is set, for example, to have a width h2=1.5 mm, which is shorter than the actual width of the sprocket hole PH due to thickness of the film F and structure of the detecting portions P1 and P2. Meanwhile, the output of the detecting portion P2 in FIG. 2 denoted by a symbol ③ is set to have a width h3=1.5 mm in the similar manner as in the detecting portion P1, with other intervals being set to h5=h6=0.25 mm, and h7=h8=0.65 mm.

In FIG. 2 showing a circuit construction for the detecting portions P1 and P2 in FIG. 1, the detecting portion P1 is connected to a set terminal "S" of a flip-flop FF1, while the detecting portion P2 is connected to a reset terminal "R" thereof, and thus, the flip-flop FF1 is arranged to be set by the positive edge of the signal from the detecting portion P1, and reset by the positive edge of the signal from the detecting portion P2 (at ④ in FIG. 3). Accordingly, during a period up to the positive edge of the signal from the detecting portion P2 after the flip-flop FF1 has been set by the signal from the detecting section P1, the flip-flop FF1 remains to be set, even if the signal from the detecting portion P1 is subjected to chattering or the like, while, after the flip-flop FF1 has been reset by the signal from the detecting portion P2, said flip-flop FF1 similarly remains in the reset state until it is set by the signal from the detecting section P1.

As is seen from the foregoing description, by the fundamental construction of the sprocket hole detecting arrangement according to a first embodiment of the present invention as described so far, adverse effects due to the chattering or the like may be completely eliminated. It should be noted here that the set and reset signals for the flip-flop FF1 are not limited only to the combination of the positive edges of signals ② and ③ as described in the foregoing embodiment, but may be modified to combinations of the positive edge of the signal ② and the negative edge of the signal ③, the negative edge of the signal ② and the positive edge of the signal ③ or the negative edge and the negative edge of signals, or that the set input and reset input may be exchanged with each other.

Subsequently, specific constructions of the detecting portions will be described hereinbelow.

Figure 4A:
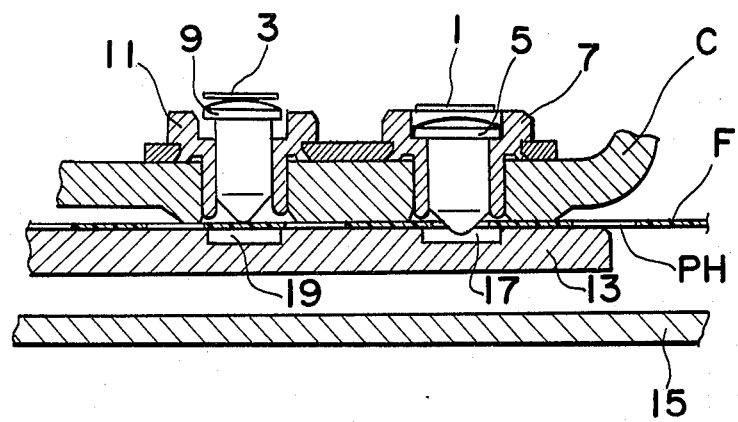
FIG. 4(c) is a fragmentary perspective view at the rear portion of the photographic camera of FIGS. 4(a) and 4(b)
Figure 4B:
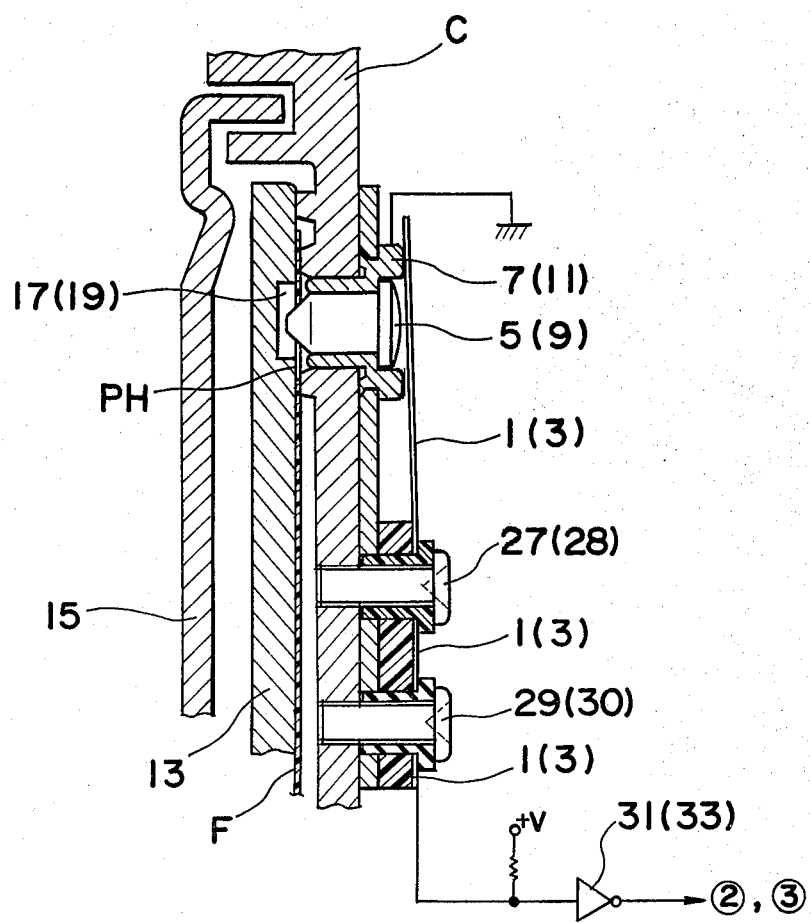
Figure 4C:
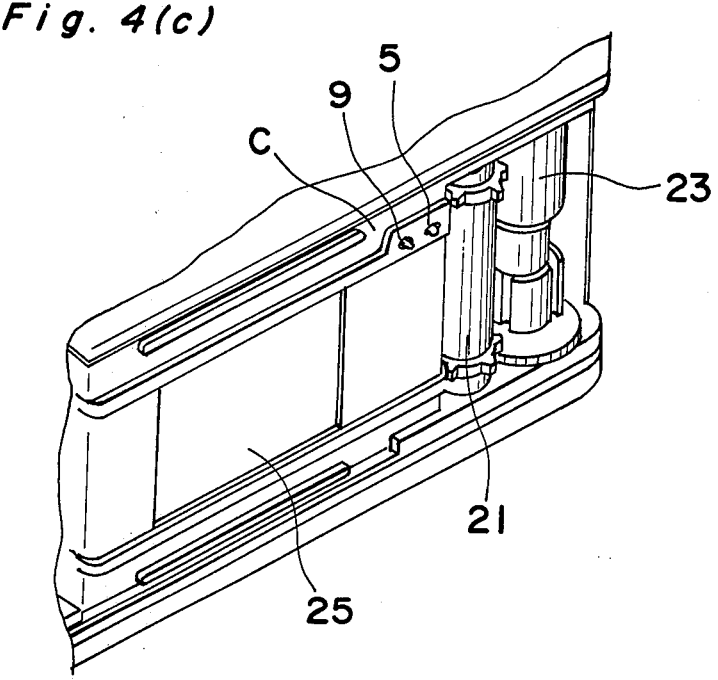

Reference is made to FIGS. 4(a) to 4(c) showing a first specific construction of the sprocket hole detecting arrangement according to the present invention, in which FIG. 4(a) is a fragmentary cross section of a photographic camera taken along a line parallel to the feeding direction of the film F, FIG. 4(b) is a fragmentary cross section of the photographic camera of FIG. 4(a) taken along a line perpendicular to the feeding direction of the film F, and FIG. 4(c) is a fragmentary perspective view at the rear side of the photographic camera of FIG. 4(a), showing positions of the detecting portions.

In FIGS. 4(a) through 4(c), the sprocket hole detecting arrangement of the present invention incorporated, for example, in a photographic camera which has lens means, focusing means, exposure means, etc. in a known manner, although not particularly shown, includes pins 5 and 9 slidably mounted in a camera body C in a manner as described hereinbelow, at positions of the camera body above a photographing frame 25 of the camera, and adjacent to the upper portion of a sprocket 21 provided beside a film take-up spool 23 as illustrated in FIG. 4(c).

The pins 5 and 9 which are slidably received in respective contact seats 7 and 11 suitably secured to the camera body C, are normally urged towards the film F by corresponding ends of plate springs 1 and 3 which are fixed, at their other ends, to the camera body C, for example, by screws 27, 28, 29 and 30 for positioning. When film sprocket holes PH are brought into positions of the pins 5 and 9, said pins 5 an 9, urged towards the film F by the plate springs 1 and 3, extend through the sprocket holes PH to enter corresponding spaces or recesses 17 and 19 formed in a pressure plate 13 mounted on a back cover 15 of the photographic camera. Accordingly, the ends of the plate springs 1 and 3 are brought into contact with contact seats 7 and 11 of electrically conductive material suitably grounded, and thus, outputs of inverters 31 and 33 connected to said plate springs 1 and 3 are made "high". On the contrary, in the absence of the sprocket holes PH at positions of the pins 5 and 9, said pins 5 and 9 are depressed by the film F in a direction opposite to the direction of urging by the plate springs 1 and 3 so as to bring the springs 1 and 3 out of contact with the contact seats 7 and 11, and thus, the outputs of the inverters 31 and 33 are made "low". Although pins 5 and 9 are so located that one complete sprocket hole can exist therebetween, such a location is apparently equivalent to the location of detecting portions P1 and P2 in FIG. 1 relative to the sprocket holes since the displacement of phase between the pair of signals is identical between the arrangement of FIG. 1 and that in FIGS. 4(a) to 4(c).

It is to be noted here that, in the further specific constructions of the sprocket hole detecting arrangements according to the present invention to be described hereinbelow, like parts as those in FIGS. 4(a) to 4(c) are designated by like reference numerals and symbols, with detailed description thereof being abbreviated for brevity.

Figure 5A:
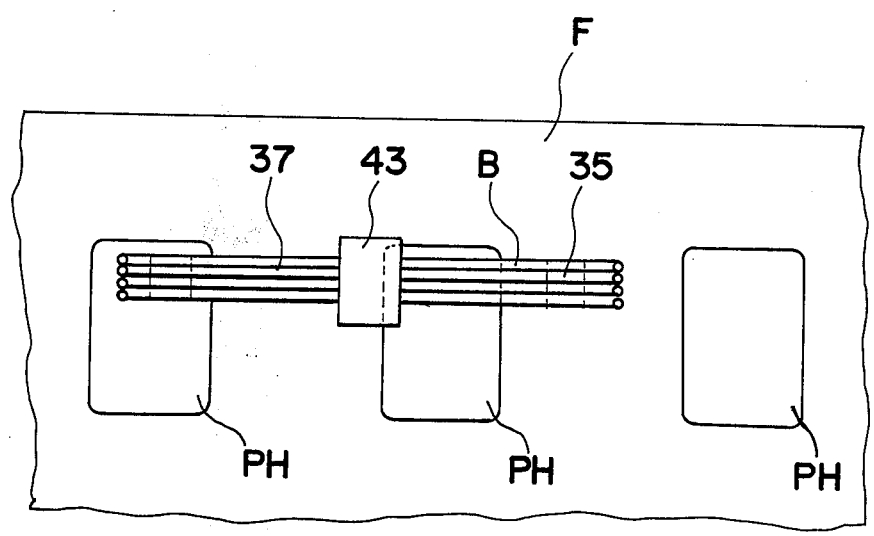
FIG. 5(a) is a fragmentary top plan view showing the relation between the film sprocket holes and sprocket hole detecting portions of a photographic camera according to a second specific construction of the first embodiment.
Figure 5B:
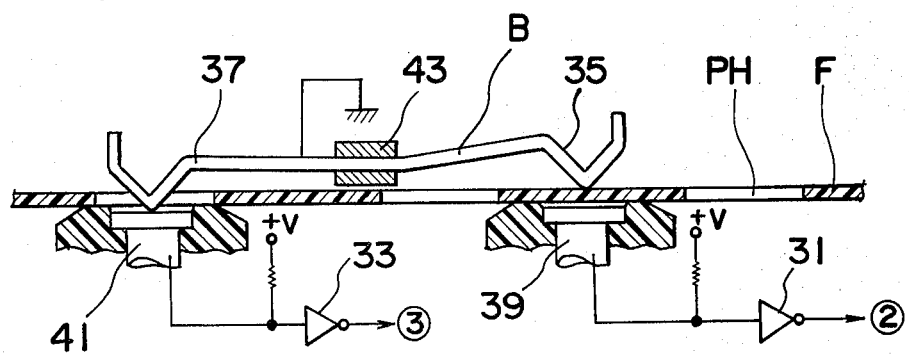
FIG. 5(b) is a fragmentary side sectional view of the arrangement of FIG. 5(a) with a schematic representation of electrical connections thereof.
Figure 5C:
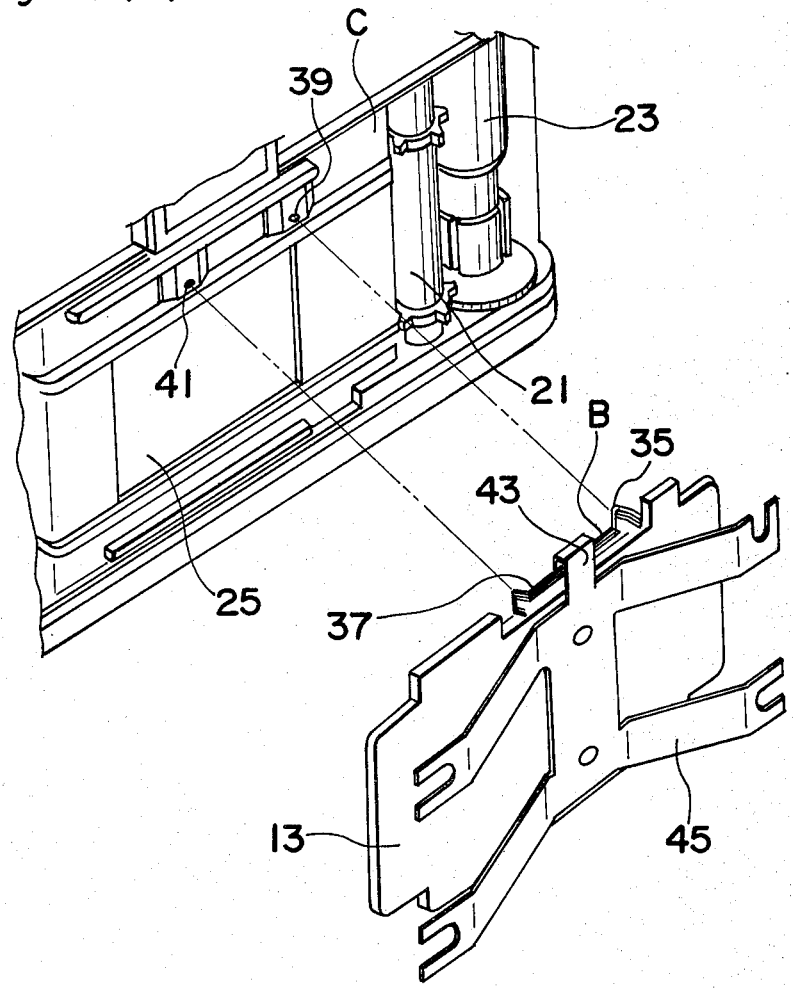
FIG. 5(c) is a fragmentary exploded perspective view of the photographic camera showing installed positions of the arrangement of FIGS. 5(a) and 5(b), FIGS. 6(a) and 6(b) are fragmentary sectional views taken in lateral and longitudinal directions of the sprocket hole detecting arrangement according to a third specific construction of the first embodiment.

In FIGS. 5(a) to 5(c) showing a second specific construction of the sprocket hole detecting arrangement according to the present invention, a pair of spaced contact pieces 39 and 41 are fixedly mounted in the camera body C in positions above the photographing frame 25 of the photographic camera and respectively coupled to inverters 31 and 33, while a contact member B in the form of a wire brush made of a plurality of electrically conductive wires suitably grounded and having contact portions 35 and 37 formed at opposite ends thereof is fixed, at its central portion, to the upper part of one surface of the pressure plate 13 corresponding to the contact pieces 39 and 41 by a fixing member 43 which is integrally formed with a plate spring 45 for mounting the pressure plate 13 onto the back cover 15 (not shown here).

In the above arrangement of FIGS. 5(a) to 5(c), the contact portions 35 and 37 of the contact member B are brought into contact with the contact pieces 39 and 41 in the presence of the sprocket holes PH to produce "High" signals from the inverters 31 and 33, while in the absence of the sprocket holes PH, the film F enters between the contact portions 35 and 37 of the contact member B and the contact pieces 39 and 41 of the camera body C so as to disconnect engagement therebetween, and consequently, the outputs of the inverters 31 and 33 are made "Low".

Figure 6A:
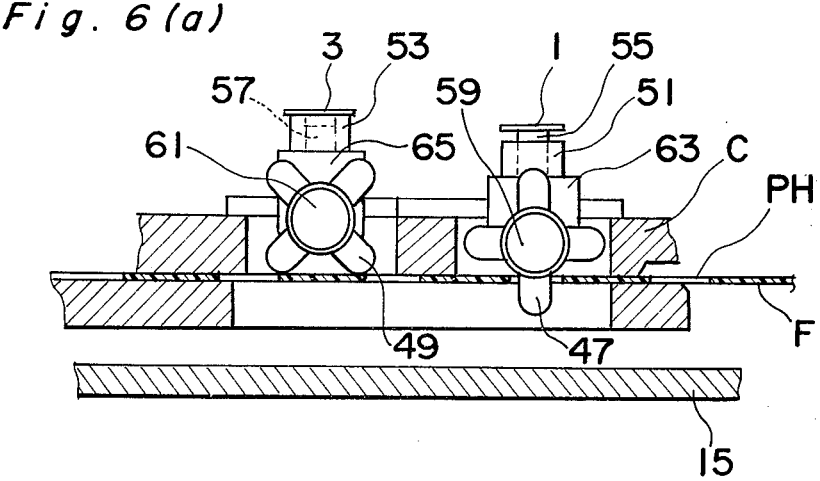
Figure 6B:
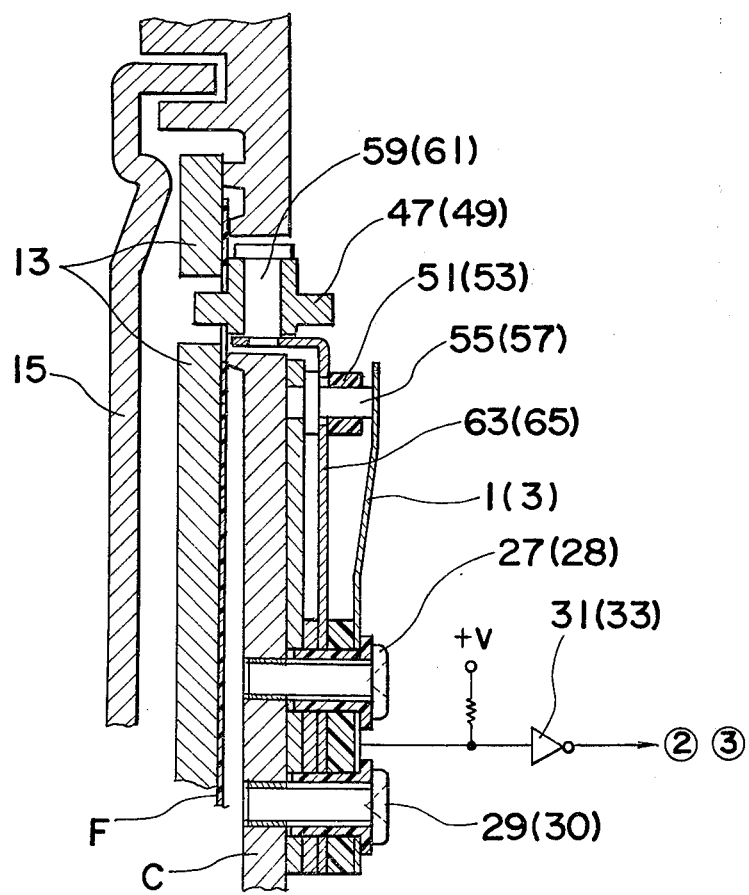

Reference is further made to FIGS. 6(a) and 6(b) showing a third specific construction of the sprocket hole detecting arrangement according to the present invention, in which FIG. 6(a) is a fragmentary cross section taken along a line parallel to the direction of feeding of the film, and FIG. 6(b) is a fragmentary cross section taken along a line perpendicular to the direction of feeding of the film.

In FIGS. 6(a) and 6(b), spaced electrically conductive members 55 and 57 are fixedly mounted in the camera body C to extend to a predetermined extent towards the inner side of the camera body C, while a pair of star wheels 47 and 49 are rotatably mounted on shafts or pins 59 and 61 which are respectively fixed on bent ends of plate springs 63 and 65 normally urged towards the film F and secured, at their other ends, to the camera body C together with the plate springs 1 and 3 as contact pieces by the screws 27 to 30. The plate springs 63 and 65 further include insulating members 51 and 53 secured thereto, and slidably fitted onto the conductive members 55 and 57.

In the above arrangement, when teeth of the star wheels 47 and 49 enter the sprocket holes PH of the film F, the conductive members 55 and 57 are brought into the state where the ends thereof protrude from the insulating members 51 and 53 for contact with the plate springs 1 and 3 (as shown at the right in FIG. 6(a) and also FIG. 6(b)), since the plate springs 63 and 65 are normally urged towards the film F, and thus, the outputs of the inverters 31 and 33 are made "High". Conversely, when the teeth of the star wheels 47 and 49 do not enter the sprocket holes PH, i.e. in the absence of the sprocket holes PH, the plate springs 63 and 65 are depressed by the film F in the direction opposite thereto, and the insulating members 51 and 53 are brought into contact with the plate springs 1 and 3 for the contact pieces (at the left in FIG. 6(a)), with the outputs of the inverters 31 and 33 being made "Low".

Figure 7A:
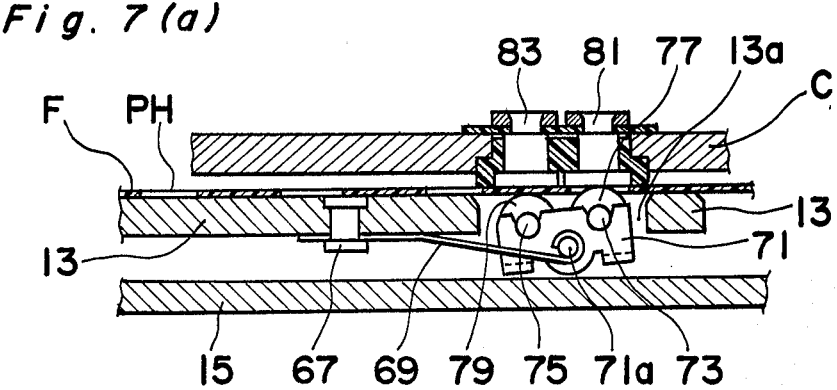
FIGS. 7(a) and 7(b) are views similar to FIGS. 6(a) and 6(b), which particularly show a fourth specific construction of the first embodiment.
Figure 7B:
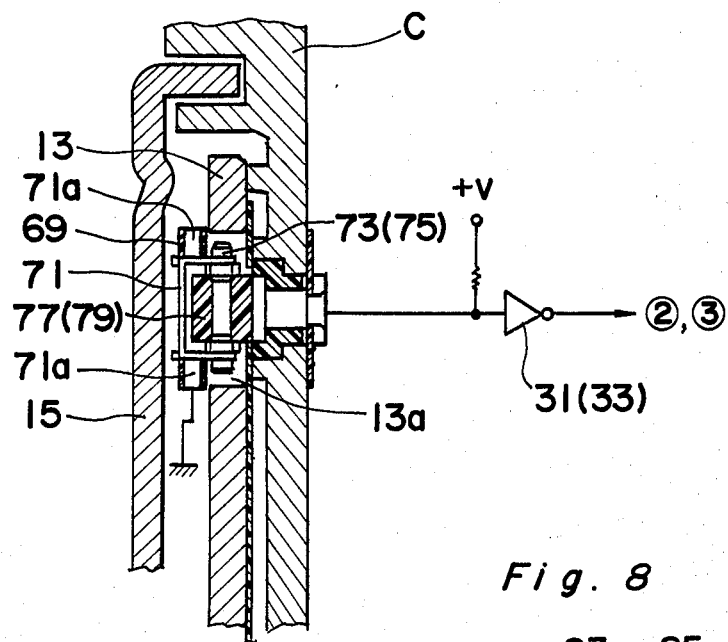

Referring to FIGS. 7(a) and 7(b) showing a fourth specific construction of the sprocket hole detecting arrangement according to the present invention, in which FIG. 7(a) is a fragmentary cross section taken along a line parallel to the direction of feeding of the film, and FIG. 7(b) is a fragmentary cross section taken along a line perpendicular to the direction of the film feeding. The detecting arrangement includes a roller holder 71 having a pair of spaced rotary shafts 73 and 75 which are rotatably supported across opposite side edges of the holder 71 and on which conductive rollers 77 and 79, for example, of electrically conductive rubber material or the like are fitted, and normally urged towards the film, through an opening 13a formed in the pressure plate 13, by a plate spring 69 fixed, at its one end, to the roller holder 71 through pins 71a and, at its other end, to the pressure plate 13 by a pin 67. A pair of spaced contact members 81 and 83 are fixedly provided in the camera body C in positions corresponding to the conductive rollers 77 and 79 and electrically connected to the inverters 31 and 33.

By the above arrangement of FIGS. 7(a) and 7(b), when the rollers 77 and 79 mounted on the roller holder 71 normally biased towards the film F, enter the sprocket holes PH, the electrically conductive rubber rollers 77 and 79 are brought into contact with the contact members 81 and 83 so as to make the outputs of the inverters 31 and 33 "High". On the other hand, upon disconnection of the conduction between the rollers 77 and 79 and contact members 81 and 83 by the film F in the absence of the sprocket holes PH, the outputs of the inverters 31 and 33 are "Low".

Figure 8:
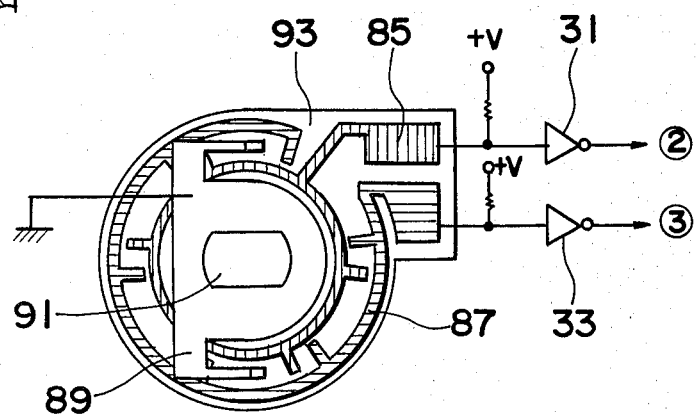
FIG. 8 is a schematic sectional view of the film sprocket hole detecting portion according to a fifth specific construction of the first embodiment.

Reference is further made to FIG. 8 illustrating a fifth specific construction of the sprocket hole detecting arrangement of the present invention.

In the arrangement of FIG. 8, the detecting portion is incorporated, for example, into a sprocket of a photographic camera in a manner as described hereinbelow. This arrangement includes a sliding member 89 suitably grounded and fixedly mounted on a rotary shaft 91 of a sprocket and the like which is arranged to be rotated in the counterclockwise direction as the film F is wound up, and electrically conductive patterns 85 and 87 which are provided on a substrate 93 suitably secured to a sprocket body (not shown) or the like and electrically connected to the inverters 31 and 33, with the sliding member 89 being arranged to slide alternately over the conductive patterns 85 and 87 as the rotary shaft 91 is rotated for producing pulse signals as shown at ② and ③ in FIG. 3. In the arrangement of FIG. 8, as compared with the states at ② and ③ of FIG. 3, the pulse width is short, and the intervals between the pulse are long, with the pulse widths for ② and ③ being arranged to be short.

Figure 9A:
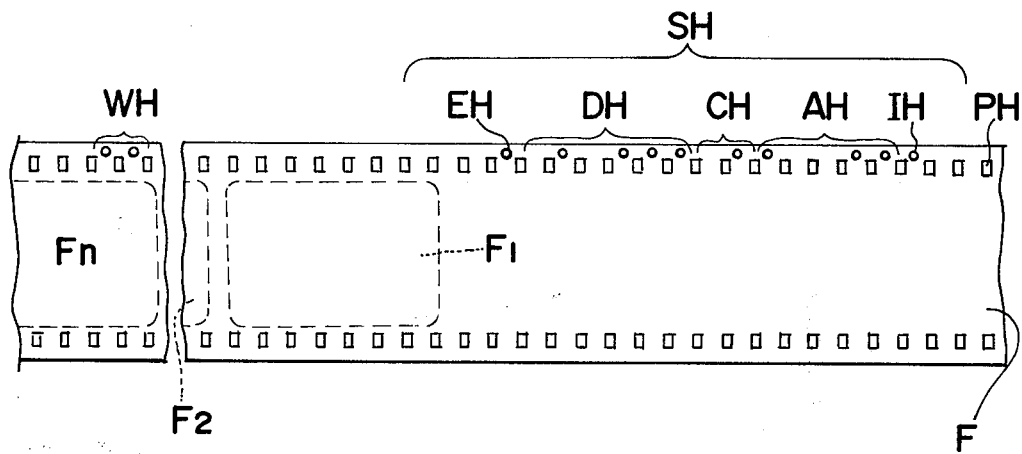
FIG. 9(a) is a fragmentary top plan view of a conventionally proposed photographic film having film code perforations formed therein.
Figure 9B:
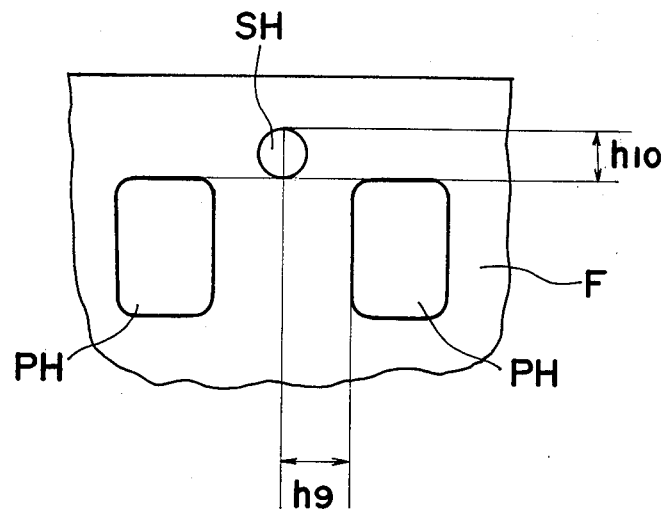
FIG. 9(b) is a view similar to FIG. 1, which particularly shows, on an enlarged scale, an essential portion of the film of FIG. 9(a)

Referring to FIGS. 9(a) and 9(b) showing one example of a photographic film conventionally proposed and provided with code perforations for film information in a series of digitally coded areas, the film F, for example, in the form of 35 mm roll film, has sprocket holes PH formed along both side edges thereof, with a position which corresponds to an initial or first frame being represented by a frame F1, a second frame by F2 and the last frame by Fn. At a film leading portion prior to the first frame Fl (i.e. at the right side portion of FIG. 9(a)), there is provided, for example, along one side row of the sprocket holes PH, the digitally coded area which includes code perforations or more specifically, code perforation holes SH formed between said sprocket holes PH and containing information corresponding to various data in the form of digital codes. The code perforations SH further include, for example, an initiation or starting indication code perforation hole IH which shows starting of the code perforations SH, film sensitivity code perforation holes AH which provide data corresponding to the film sensitivty ("11001" in this example), frame number code perforation holes CH which represent data corresponding to the number of frames to be exposed, i.e. the number of available film frames ("10" in this example), film type and latitude code perforation holes DH which show data related to the film type and latitude ("111010" in this example), and an end or termination indication code perforation hole EH which indicates termination of the code perforations SH. Between the sprocket holes PH at one side of the last frame Fn, there are further provided last frame indication code perforation holes WH for indicating the last frame. In the film F as shown in FIG. 9(a), it is so arranged, for example, that the diameter of each code perforation hole SH is represented by h10=1 mm, while the interval between the center of the code perforation hole SH and one neighboring side of the sprocket hole PH is set to be h9=1.4 mm.

For better understanding, the camera system to be described in detail henceforth will be briefly explained hereinbelow.

In the case where the film F as described with reference to FIGS. 9(a) and 9(b) is employed, upon closing of the back cover of the photographic camera (not shown here), with the film F loaded, the film F is automatically forwarded "idly" without exposure, and when the end indication code perforation hole EH is detected, the system further displaces the film F from the code perforation hole EH to a predetermined position (for example, by the amount of the film F equivalent to three sprocket holes PH) and stops the "idle" feeding of the film F. During the "idle" feeding as described above, the film data are read through the code perforations SH, and the data for the number of available film frames are preset in a down-counter as a film counter (not shown here), with other data memorized in a register (not shown here), and thus, the photographing function is effected on the basis of the data memorized in the register. Upon completion of photographing, the film F is wound up, during which time, counting of the sprocket holes PH are effected, and when eight sprocket holes are counted, the winding is suspended, with substraction of 1 from the down-counter and simultaneous addition of 1 to an up-counter (not shown here). Meanwhile, in the film counter, the remaining number of available frames or number of frames exposed is indicated according to change-over of switching means (not shown here).

Upon completion of the exposure of the last frame Fn, with the last frame indication perforation holes WH detected, rewinding of the film is started, and when the leading end of the film F is disengaged from the take-up spool, the rewinding is suspended.

In the case of an ordinary film without provision of the code perforations SH, the "idle" feeding without exposure as described earlier is suspended upon counting of a predetermined number of sprocket holes PH, for example, twenty-four sprocket holes, while only the number of frames actually exposed for photographing is indicated in the film counter. Meanwhile, if the sprocket holes PH are not counted, for example, up to the eighth hole thereof after a predetermined period of time from the starting of the winding, i.e. when the movement of the film is obstructed by some causes, the rewinding is started, which is stopped upon disengagement of the loaded film.

Figure 10A:
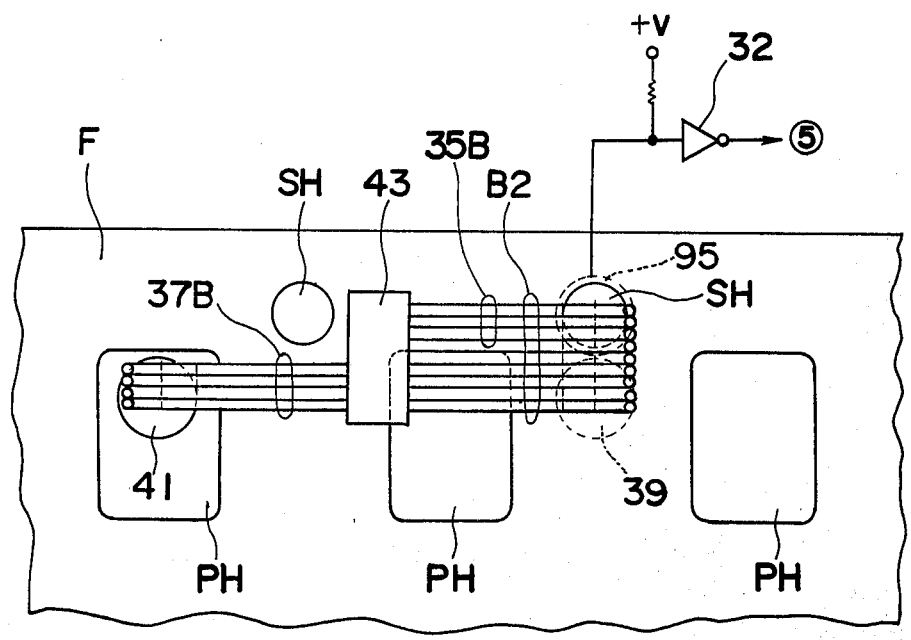
FIG. 10(a) is a fragmentary top plan view of a detecting arrangement particularly suitable for detection of the film as shown in FIG. 9(a), which is a modification of FIGS. 5(a) to 5(c)
Figure 10B:
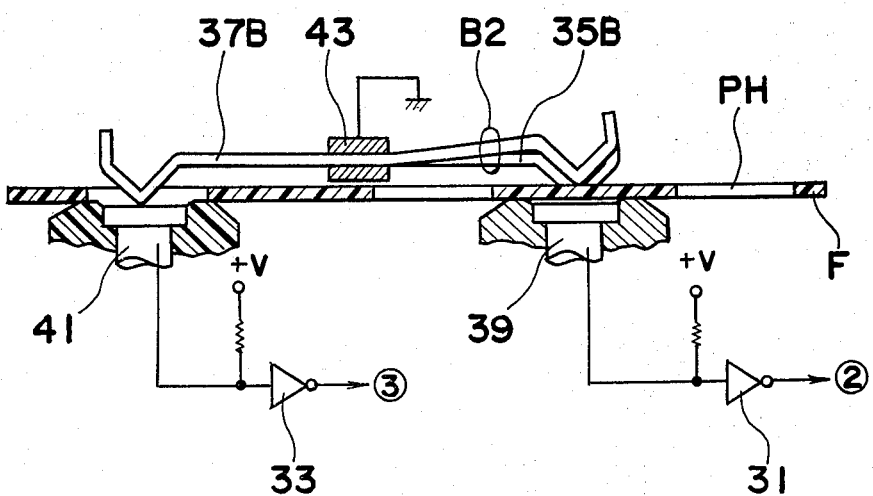
FIG. 10(b) is a fragmentary side sectional view of the detecting arrangement of FIG. 10(a) with a schematic representation of electrical connections thereto.
Figure 10C:
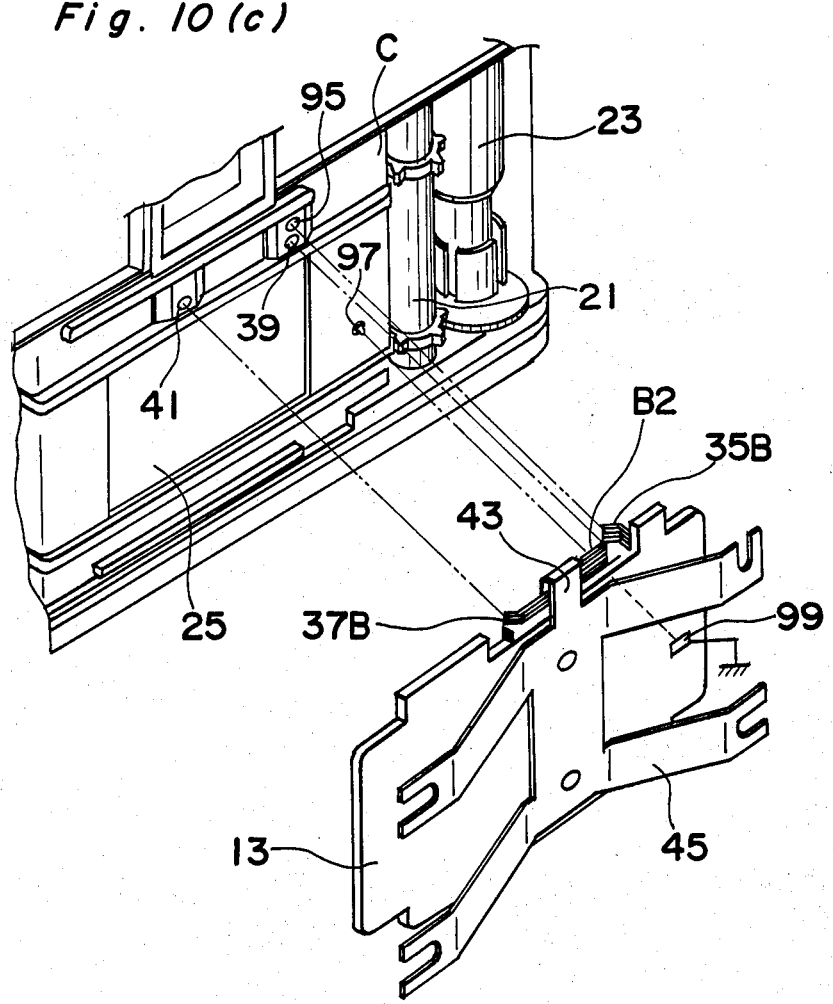
FIG. 10(c) is a fragmentary exploded view of the photographic camera to which the arrangement of FIGS. 10(a) and 10(b) are applied.

Reference is further made to FIGS. 10(a), 10(b) and 10(c) showing a specific construction of the detecting arrangement for the code perforations SH and sprocket perforations PH. In the construction of FIGS. 10(a) to 10(c), a detecting portion for the code perforations SH and a film detecting switch are further added to the sprocket hole detecting arrangement of FIGS. 5(a), 5(b) and 5(c) as described hereinbelow.

More specifically, the film code perforation and sprocket hole detecting arrangement of FIGS. 10(a) to 10(c) further includes, in addition to the arrangement described with reference to FIGS. 5(a) to 5(c), another contact piece 95 for the code perforations SH fixedly provided in the camera body C in a position above the contact piece 39 for the sprocket holes PH and electrically connected to an inverter 32, and a pin 97 (FIG. 10(c)) also fixed on the camera body C in a position, for example, beside the photographing frame 25 of the camera body C and below the contact pieces 95 and 39 at the right side in FIG. 10(c), and a contact piece 99 suitably grounded and provided on the film pressure plate 13 in a position corresponding to the pin 97, with said pin 97 and contact piece 99 constituting a film detecting switch. The contact pieces 39 and 95 as referred to above are so disposed as to be positioned intermediate between the initial perforation hole PH and a subsequent perforation hole PH when a film frame for exposure is stopped within the photographing frame 25 of the photographic camera.

In the above arrangement, when part of the contact portions 35B of the contact member B2 in the form of a wire brush enters the code perforation hole SH during feeding of the film F, the contact piece 95 and the contact member 35B are brought into contact with each other to produce a "High" signal from the inverter 32. Meanwhile, in FIG. 10(c), when the film F enters between the pin 97 of the camera body C and the contact piece 99 which is grounded, there is no contact therebetween, while in the absence of the film F, the pin 97 and the contact piece 99 are brought into contact with each other to establish conduction therebetween, whereby loading or unloading of the film may be detected. It is to be noted here that the positions of the pin 97 and the contact piece 99 constituting the film detecting switch are not limited to those of the above embodiment, but may be modified in various way, for example, to be provided in a film inserting portion of the spool 23.

Figure 11:
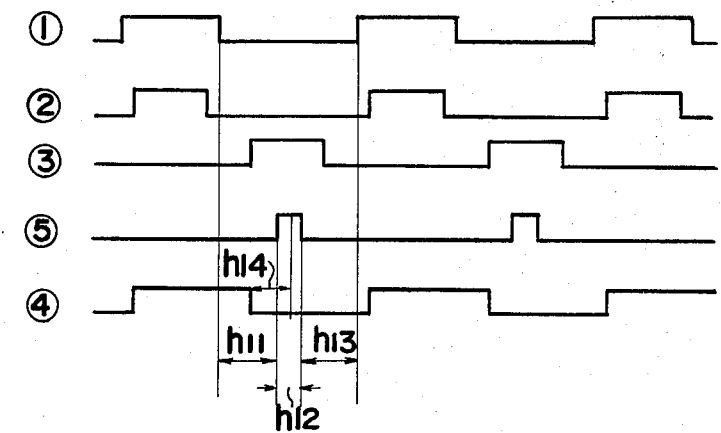
FIG. 11 is a time chart explanatory of the functions of the detecting arrangement shown in FIGS. 10(a), 10(b) and 10(c)

In the time-chart of FIG. 11 related to the functions of the detecting arrangement of FIG. 10(a), the symbol ① represents the sprocket holes PH, symbols ② and ③ respectively denote outputs of the inverters 31 and 33, symbol ④ shows the Q output of the flip-flop FF1 in FIG. 2, and symbol ⑤ indicates the output of the inverter 32 of FIG. 10(a), i.e. the detection output of the code perforations SH in the similar manner as in FIG. 3. In FIG. 11, the relations in the width and interval are, for example, such that h11=h13=1.15 mm and h12=0.5 mm.

Figure 12:
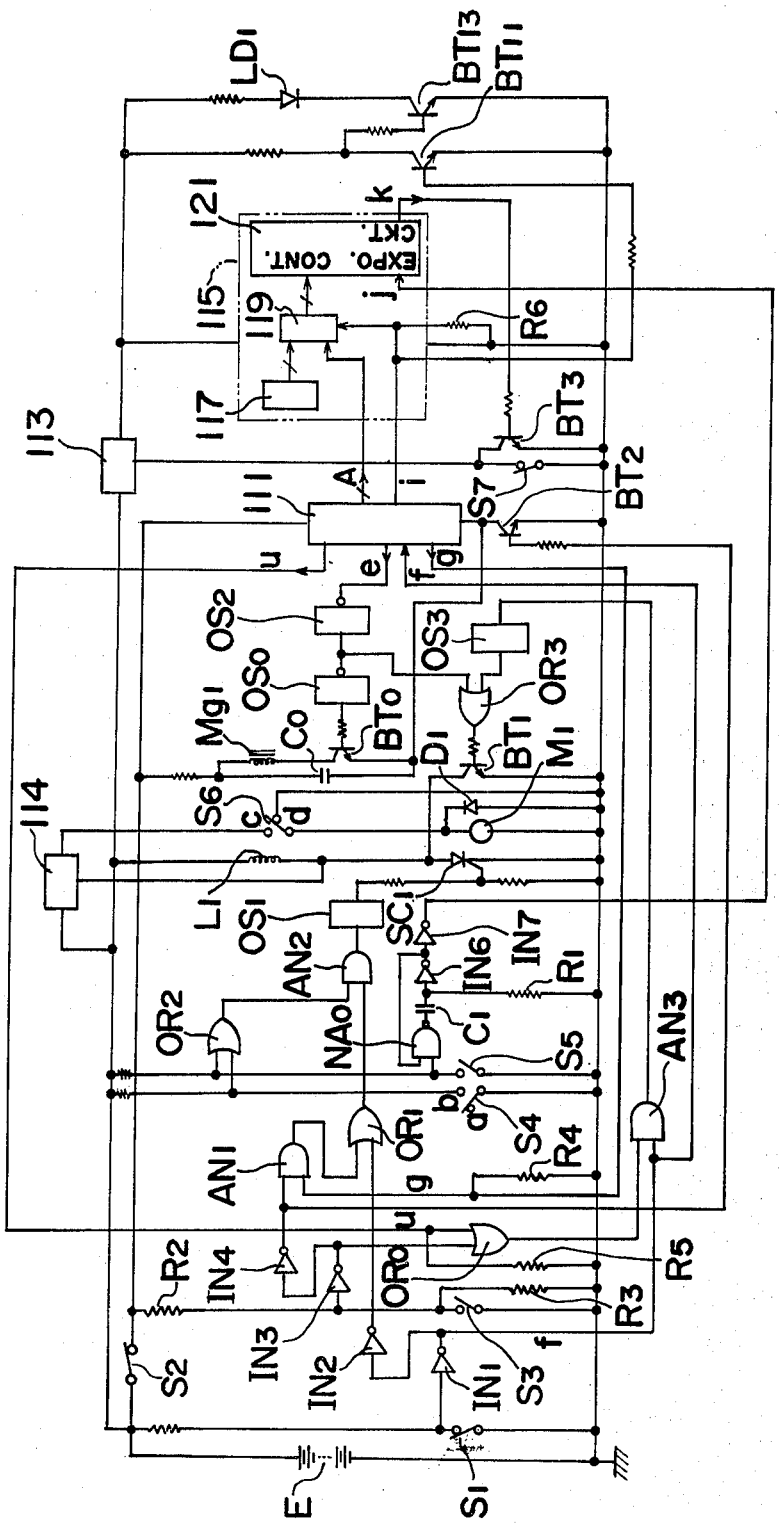
FIG. 12 is an overall electrical schematic of a photographic camera system according to the present invention.

Referring to FIG. 12 showing the entire control circuit for realizing the camera system as described in the foregoing, there are provided a switch S1 connected in parallel to a power source E through a suitable resistor so as to be closed upon shutter charging and opened upon completion of exposure control, a switch S2 connected in series to the power source E and further coupled to a circuit 111 to be described later so as to be closed upon closure of the back cover of the photographic camera, a switch S3 equivalent to the film loading detection switch in FIG. 10(c) which has the pin 97 and contact piece 99 for being opened upon loading of the film F and closed in the absence of the film, and connected, in parallel with a power source E through a resistor R2, a resistor R3 being connected in parallel with the switch S3, a switch S4 connected through a resistor across the power source E for changeover between a continuous photographing mode and a one frame photographing mode and arranged to establish the continuous photographing mode when connected to the terminal "a" and the one frame photographing mode when switched over to the terminal "b", and another switch S5 for releasing also connected across the power source E and adapted, when closed, to cause "High" pulses to be developed from a one-shot circuit including a NAND circuit NA0, inverters IN6 and IN7, a capacitor C1, and a resistor R1 connecting the junction between the capacitor C1 and inverter IN6 to the ground. The junction between the switch S1 and the resistor connected in series thereto is connected, through an inverter IN1, to one input of an AND circuit AN3 and through an inverter IN2, to an OR circuit OR1 the output of which is connected to an AND circuit AN2. The output of the AND circuit AN2 is connected to a one shot circuit OS1, the output thereof being connected to a series of resistors whose junction is coupled to a gate terminal of a thyristor SC1. The junction between the switch S3 and the resistor R2 is connected, through an inverter IN3 and an OR circuit OR0, to the other input of the AND circuit AN3, and also, to the OR circuit OR1 through the inverter IN3, an inverter IN4, and an AND circuit AN1. The other input terminal of the AND circuit AN1 is connected to the ground through a resistor R4 and to the terminal "g" of the circuit 111 to be described later. The junctions between the switches S4 and S5 and the corresponding resistors are respectively coupled to the inputs of an OR circuit OR2 which is connected to the AND circuit AN2. Between a line leading from the power source E to a constant voltage source 113 and the ground, there are provided a series-connection of a constant voltage source 114 for driving a motor M1, a switch S6, and the motor M1 connected in parallel to a diode D1, and also a series connection of a relay magnet L1 and the thyristor SC1, with a junction therebetween being further coupled to said constant voltage source 114 so that upon conduction of the magnet L1, the switch S6 is connected to the terminal "c", while during non-conduction thereof, it is connected to the terminal "d". By the rotation of the motor M1, exposure control mechanism is first charged through a charging mechanism (not shown), with subsequent winding-up of the film F by a film winding mechanism (not shown).

A transistor BT1 having its collector connected to the junction between the magnet L1 and thyristor SC1, its emitter to the ground, and its base to an OR circuit OR3 through a resistor, is arranged to be made conductive during the "High" period of the pulses from the OR circuit OR3 for cutting off the retaining current for the thyristor SC1 so as to make the constant voltage source 114 inoperative and the relay magnet L1 nonconductive, thus short-circuiting opposite ends of the motor M1 to stop the charge and winding-up functions.

The circuit 111 is connected to the switch S2, to the base of the transistor BT1 through the OR circuit OR0, the AND circuit AN3, a one shot circuit OS3 and the OR circuit OR3 and resistor, to the base of a transistor BT0 through one shot circuits OS2 and OS0 and a resistor, to the output of the inverter IN1, and also to the collector-emitter circuit of a transistor BT2 whose base is coupled through a resistor to the inverter IN4 while the collector-emitter circuit of the transistor BT0 connected in series with a magnet Mg1 is further connected in parallel with a capacitor Co so as to be further connected to the line leading from the switch S2 to the collector of transistor BT2. The circuit 111 is arranged to be energized by the transistor BT2 when the output of the inverter IN4 becomes "High" during closure of the back cover (i.e. closure of the switch S2) with the film loaded (i.e. with the switch S3 opened), and is incorporated therein with circuits for film idle feeding, winding-up, rewinding control, circuits for reading the code perforations SH and memorizing the read data and a circuit for the film counter as described in detail later with reference to FIG. 13. The above circuit 111 outputs at its terminal "e", the stopping signal for film winding-up, at its terminal "f", the termination signal for exposure control by the switch S1, at its terminal "g", the signal indicating completion of the idle feeding, at its terminal "i", the signal showing that the data of the film F are read and memorized, and at its terminal "A", the data thus read. It is to be noted here that signals with a plurality of bits are represented by marking signal lines with hatching.

Meanwhile, the constant voltage circuit 113 connected to the power source E, is arranged to function upon closure of a photoelectric switch S7 for energization of a circuit 115 surrounded by a two dot chain line, which includes a data output circuit 117 for outputting data manually set such as film sensitivities, etc., a data selector 119 coupled to said circuit 117 and the terminal "A" of the circuit 111 and also to an exposure control circuit 121. The data selector 119 is arranged to output the data from the terminal "A", with the terminal "i" "High" when the data are memorized, and to produce the data from the data output circuit 117, with the terminal "i" "Low" when the data are not memorized. It is to be noted that when the terminal "i" is "Low", since the data are not output from the terminal "A", manual setting of the data is required. For providing a warning of the above state, a series-connection of a resistor, a light emitting diode LD1 and a transistor BT13, and another series-connection of a resistor and a transistor BT11 are connected in parallel with the circuit 115, with the base of the transistor BT13 connected to the junction between the resistor and the collector of the transistor BT11, and the base of the transistor BT11 connected to the line connecting the terminal "i" of the circuit 111 through a resistor. The emitters of the transistors BT11 and BT13 are connected to the ground. The light emitting diode LD1 is rendered conductive for the warning when the transistor BT11 is turned OFF, with the transistor BT13 turned ON. The exposure control circuit 121 coupled, at its terminal "j", to the inverter IN7 and at its terminal "k", to the base of a transistor BT3 connected in parallel to the switch S7 through a resistor and further connected to the circuit 113, is arranged to effect light measuring, calculation and indicating functions upon initiation of energization from the circuit 113, and starts the exposure control function when the release signal is input from the terminal "j" through the inverter IN7. The terminal "k" of the circuit 121 remains "High" during the period from the starting of the exposure control function to the termination thereof for maintaining the transistor BT3 in the conductive state. Accordingly, the transistor BT3 functions for self-retaining of the energization of the exposure control section. It should be noted here that inverters, AND circuits, OR circuits, and one shot circuits whose power lines are not particularly shown are all directly fed with power by the power source E.

Subsequently, functions of the foregoing circuit arrangement in the case where the film F is not loaded will be explained hereinbelow with reference to FIG. 12.

In the above case, the output of the inverter IN4 is "Low" irrespective of opening or closure of the back cover. More specifically, when the back cover is open, the switch S2 is opened, and input to the inverter IN3 is made "Low" through the resistor R3, while upon closure of the back cover, the switch S3 is closed due to absence of the film F, with the input to the inverter IN3 similarly remaining "Low". Accordingly, the transistor BT2 is kept non-conductive, without functioning of the circuit 111.

When the release switch S5 is closed, the release signal from the inverter IN7 is fed to the exposure control circuit 121, and the exposure control is effected based on the data from the data output circuit 117. Upon completion of the exposure control function, the switch S1 is opened, and thus, outputs of the inverter IN2 and OR circuit OR1 are "High". In the above case, if the switch S4 is connected to its terminal "a", i.e. in the case of the continuous photographing mode, since the output from the OR circuit OR2 is "High", the output of the AND circuit AN2 is raised "High", and by this rising signal, one pulse of "High" is produced from the one shot circuit OS1 so as to make the thyristor SC1 conductive, and thus, the switch S6 is connected to its terminal "c" through conduction of the magnet L1. Therefore, the voltage from the constant voltage circuit 114 is applied to the motor M1, which is then rotated at a constant speed for charging the exposure control mechanism. Upon completion of the charging, the switch S1 is closed to raise the output of the inverter IN1 to "High". In the above case, since the output of the inverter IN3 is "High", the output of the AND circuit AN3 rises to "High", and by this positive edge, one pulse of "High" is developed from the one-shot circuit OS3 so as to be supplied to the base of the transistor BT1 through the OR circuit OR3 for momentarily rendering said transistor BT1 conductive, whereby the thyristor SC1 is rendered to be non-conductive due to reduction of current flowing therethrough to be lower than the retaining current, with the coil L1 being also made non-conductive, and thus, the switch S6 is connected to the terminal "d". Accordingly, the motor M1 is short-circuited at opposite ends thereof, with the rotation thereof interrupted. For absorbing counter-electromotive force, the diode D1 is connected in parallel with the motor M1. Meanwhile, by the non-conduction of the thyristor SC1 and transistor BT1, the constant voltage circuit 114 is also made inoperative.

In the case of one frame photographing mode, with the switch S4 connected to the terminal "b", if the release switch S5 is kept closed even when the output of the OR circuit OR1 becomes "High" upon completion of the exposure control function, the output of the OR circuit OR2 remains "Low", with the output of the AND circuit AN2 also being "Low", and thus, the winding-up function is not started. Upon opening of the release switch S5, the outputs of the OR circuit OR2 and AND circuit AN2 are raised to "High", and the pulse of "High" is produced from the one-shot circuit OS1 to start the winding-up function, and subsequently, similar functions as described earlier are repeated.

Conversely, in the case where the film F is loaded, when the back cover is closed, with the film F loaded, the input for the inverter IN3 is made "High" by the resistor R2, while the output of the inverter IN4 also becomes "High", in which case, the transistor BT2 is rendered conductive to bring the circuit 111 into a functioning state. As stated later, since the output of the terminal "g" is "High" in the above state, a "High" signal is output from the AND circuit to start the function for film idle feeding. Meanwhile, the starting of the winding function is effected by the signals from the switch S1 and inverters IN1 and IN2 in a similar manner as in the case where the film F is not loaded as described earlier.

Furthermore, in the case where the film F is loaded, upon starting of rotation of the motor M1, the exposure control mechanism is first charged by the known charging mechanism, and since the output of the inverter IN3 is "Low" in this case, the output of the AND circuit AN3 remains "Low", with the motor M1 continuing to rotate for successive film winding-up by a known film winding-up mechanism, while stopping of the winding-up function is effected by the sprocket hole signal developed from the terminal "e" of the circuit 111 through circuit functioning to be described later. When the sprocket hole signal from the terminal "e" falls to "Low", a "High" signal is output from the one-shot circuit OS2 for a predetermined period of time, during which period, the transistor BT1 is made conductive, with the motor M1 kept rotated, and at a time where the transistor BT1 is made non-conductive, the motor M1 is short-circuited. The time width for the above is arranged to be equivalent to the width h14 in FIG. 11 or to be slightly longer than that. Thus, by the negative edge of the output from the one-shot circuit OS2, one pulse of "High" is produced from the one-shot circuit OS0 to make the transistor BT0 to be momentarily conductive, and the charge held in the capacitor Co is discharged through the coil of the magnet Mg1 having a permanent magnet as a core for stopping the winding-up mechanism and consequently, the winding-up function. In the above case, although the motor M1 which is short-circuited is rotated to a certain extent by the inertia force, if such rotation is arranged not to be transmitted to the winding-up mechanism by a known slipping mechanism, the film may be accurately restricted for its frame position. It may be so arranged that the charging of the stopping mechanism as described above is effected, for example, at the same time as the charging of the exposure control mechanism or at the completion of functioning of the exposure control mechanism.

Figure 13:
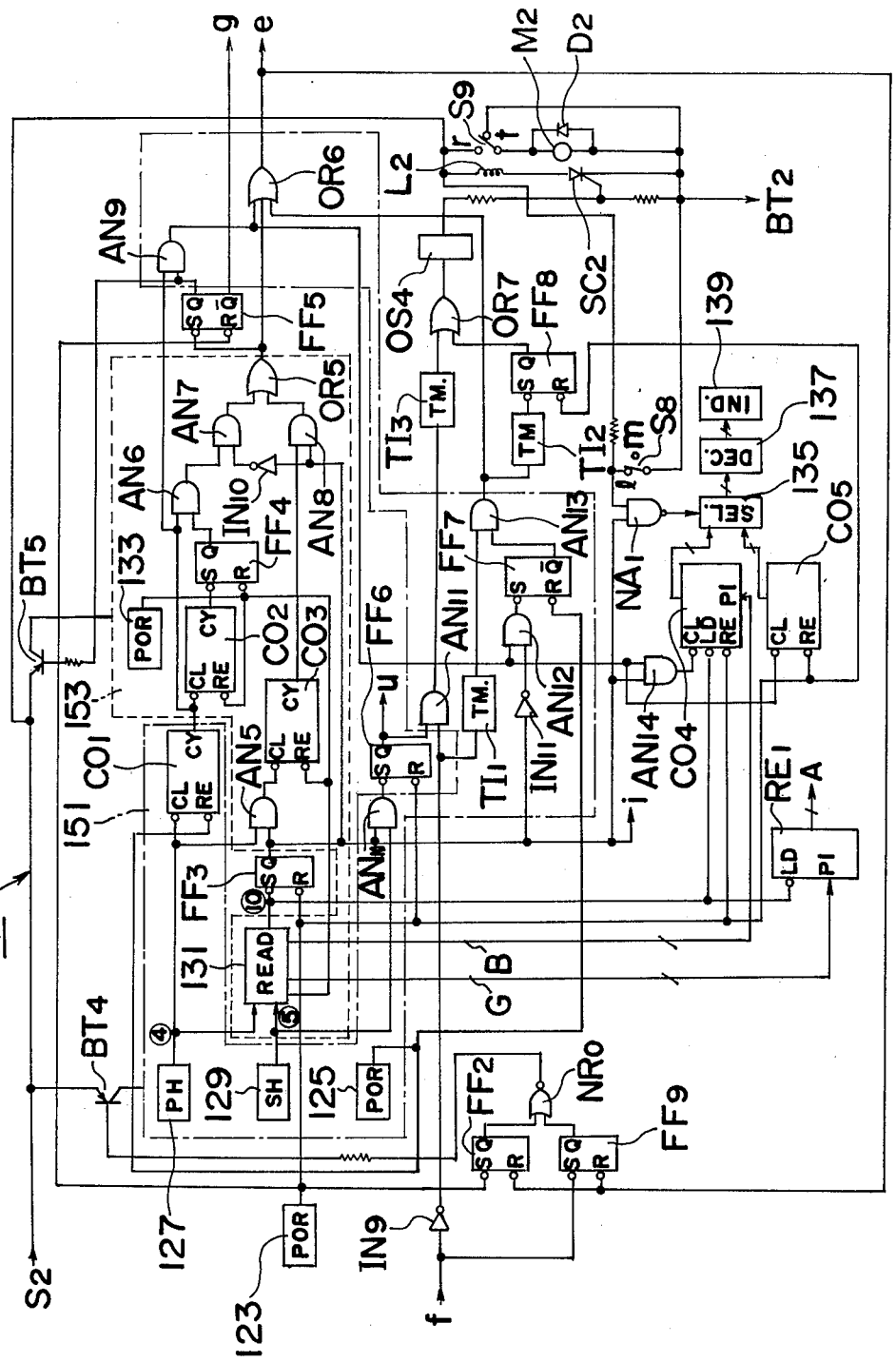
FIG. 13 is an electrical schematic specifically showing the circuit construction of a block 111 employed in the diagram of FIG. 12.

Referring also to FIG. 13 showing a specific circuit construction of the circuit 111 of FIG. 12, the functions thereof will be described hereinbelow with reference to the case where the film without having code perforations SH is loaded.

Upon closing of the back cover, with the film being loaded, the transistor BT2 is made conductive as described earlier to start the film idle feeding by the motor M1. When the energization of the circuit 111 is started, reset pulses are output from a power-on reset circuit 123 so as to reset flip-flops FF3, FF5, FF6, and FF8, a down counter CO4, and an up counter CO5 coupled to said circuit 123 as shown, while a flip-flop FF2 is set. Upon setting of the flip-flop FF2, the output of a NOR circuit NR0 coupled thereto is made "Low", and thus, a transistor BT4 connected at its base to the NOR circuit NR0, and inserted at its emitter-collector circuit between the line leading to the switch S2 and a circuit 151 surrounded by one dot chain lines, is rendered conductive for energization of said circuit 151, whereby reset pulses are produced from a power-on reset circuit 125 for resetting a counter CO1 and a flip-flop FF7 coupled thereto. Moreover, by the resetting of the flip-flop FF5, a transistor BT5 connected at its base to the junction between the terminal "Q" of the flip-flop FF5 and an AND circuit AN9 through a resistor, and inserted, at its emitter-collector circuit, between the line leading to the switch S2 and a circuit 153 surrounded by dotted lines, is made conductive for starting energization of said circuit 153, while reset pulses are developed from a power-on reset circuit 133 provided in the circuit 153 so as to reset a flip-flop FF4 and counters CO2 and CO3 connected to said circuit 133, while the reset pulses are further input to a reading circuit 131 coupled to the circuit 133. It is to be noted here that circuits other than the circuit 153 surrounded by the dotted lines and the circuit 151 surrounded by the one dot chain lines are all energized through the switch S2 described with reference to FIG. 12.

Upon idle feeding of the film, the sprocket hole signal from a sprocket hole detecting circuit 127 according to the present invention is input to the octal counter CO1 connected thereto, from which an eighth input pulse is developed at its carry terminal "CY" so as to be input to a clock terminal "CL" of the binary counter CO2 connected to said counter CO1. Accordingly, from the above counter CO2, a sixteenth sprocket hole signal from the starting of the film "idle" feeding is output, and by the negative edge of this sprocket hole signal, the flip-flop FF4 is set, with the gate of an AND circuit AN6 coupled to the flip-flop FF4 being opened. Thus, an eighth sprocket hole signal to be subsequently developed from the counter CO1, i.e. a twenty-fourth sprocket hole signal from the initiation of the film "idle" feeding, is output from the AND circuit AN6. In the case of a film without code perforations SH, since no pulses are produced from a terminal ⑩ of the reading circuit 131, the output of an inverter IN10 coupled to the flip-flop FF3 becomes "High", with the flip-flop FF3 kept reset, and the sprocket hole signal from the AND circuit AN6 is produced at the terminal "e" through an AND circuit AN7, and OR circuits OR5 and OR6, and the idle feeding function (winding-up function) of the film is suspended by the circuit as described with reference to FIG. 12.

The sprocket hole signal from the OR circuit OR5 is fed to the flip-flop FF5 so as to set said flip-flop FF5, with the signal at terminal "g" made "Low", and the gate of the AND circuit AN9 connected to the flip-flop FF5 is opened. Meanwhile, since the terminal "g" is "Low", the output of the AND circuit AN1 in FIG. 12 remains "Low". In other words, the flip-flop FF5 is set upon completion of the film idle feeding, with the film loaded. Furthermore, upon setting of the flip-flop FF5, the transistor BT5 is made non-conductive, and thus, the circuit 153 surrounded by the dotted lines becomes inoperative. Therefore, the above circuit 153 is arranged to function only during idle feeding of the film. Moreover, the sprocket hole signal from the OR circuit OR6 is fed to the flip-flop FF2 to reset said flip-flop FF2, and thus, the transistor BT4 is made non-conductive, with the energization of the circuit 151 surrounded by the one dot chain lines being suspended.

Subsequently, upon completion of the exposure control function, the winding-up function is started in the manner as described previously. When the winding-up function is initiated, the switch S1 in FIG. 12 is opened, and the output "f" of the inverter IN1 is inverted to be "Low", whereby a flip-flop FF9 connected to the line for the output "f" is set, with the output of the NOR circuit NR0 made "Low" so as to turn on the transistor BT4 for energization of the circuit 151. In other words, the circuit 151 is energized during the idle feeding and winding-up of the film. Upon output of a pulse by an eighth sprocket hole from the counter CO1, i.e. a pulse indicating that the film equivalent to one frame has been displaced, the displacement of the film is suspended by the circuit as described with reference to FIG. 12. Moreover, the pulse from the AND circuit AN9 is appllied to the clock terminal "CL" of the up counter CO5 coupled thereto, with the counting advanced by one. In the above state, since the flip-flop FF3 remains reset, the gate of an AND circuit AN14 connected to the down counter CO4 is closed, without input of clock to said down counter CO4. Meanwhile, since the flip-flop FF3 is reset, one input of an NAND circuit NA1 connected thereto is necessarily "Low", and therefore, even when a switch S8 coupled to the NAND circuit NA1 is connected to either of its terminal "l" or "m", the output becomes "High", and thus, data for the number of frames photographed fed by the up counter CO5 are output from a data selector 135 coupled to said up counter CO5 for indication of the number of frames photographed by an indicator 139 through a decoder 137.

Between the output of an inverter IN9 and an AND circuit AN13, a timer TI1 is inserted for counting a predetermined period of time, which is arranged to be longer than time required for winding-up the film equivalent to one frame. The timer TI1 is arranged to start the counting upon inversion of the output of the inverter IN9 to "High" through inversion of the signal at terminal "f". In the above case, since the flip-flop FF3 remains to be reset, the output of an inverter IN11 connected between the flip-flop FF3 and the flip-flop FF7 through an AND circuit AN12 is "High". Upon completion of time counting by the timer TI1, with output of the "High" pulse, if the sprocket hole signal is not developed from the AND circuit AN9, i.e. if the film is stretched at its last frame, the gate of the AND circuit AN13 connected to the flip-flop FF7 is in the opened condition because of the flip-flop FF7 remaining to be reset, for developing the "High" pulse from the timer TI1, which pulse is output from the terminal "e" through the OR circuit OR6 so as to stop the winding-up function in the similar manner as described earlier. Furthermore, after a predetermined period of time from the starting of time counting by a timer TI2 connected between the AND circuit AN13 and flip-flop FF8, through the positive edge of the pulse from the AND circuit AN13, one "High" pulse is developed. The above predetermined period of time is arranged to be longer than time from the output of the "High" pulses from the AND circuit AN13 to complete suspension of the winding-up function. Upon developing of the "High" pulse from the timer TI2, the flip-flop FF8 is set, and the output of an OR circuit OR7 connected to the flip-flop FF8 rises to be "High". By the above function, one "High" pulse is output from a one-shot circuit OS4 coupled to the OR circuit OR7 to turn on a thyristor SC2 connected in series to a relay L2, which is actuated to connect a switch S9 to the terminal "r" for starting rotation of a motor M2 connected in series to said switch S9, with a diode D2 connected in parallel to the motor M2, thus rewinding of the film being effected by a known film rewinding mechanism. Upon completion of the rewinding, with the film being released from the state of loading, the switch S3 in FIG. 12 is closed, and the output of the inverter IN4 is "Low", and the transistor BT2 becomes nonconductive for suspending energization of the circuit 111, whereby the switch S9 is connected to the terminal "t", with the motor M2 short-circuited for suspending the rewinding function.

Subsequent to the foregoing description with reference to the case where the film without the code perforations SH is employed, functions when a film having the code perforations SH is adopted will be described hereinbelow.

Upon closing of the back cover, with the film loaded, the film idle feeding is started in the similar manner as in the case where the film without code perforations SH is employed, and the reading circuit 131 reads the data of the film based on the output pulses from the sprocket hole detecting portion 127 and a code perforation hole detecting portion 129 connected thereto in the manner as described with reference to FIG. 10. Thus, the pulse based on the code perforation hole EH is developed from the terminal ⑩ of the reading circuit 131, and by the negative edge of the above pulse, the data for the number of frames which can be photographed from the terminal "B" of the reading circuit 131 are taken in the down counter CO4 (preset), and other film data from the terminal "G" of the reading circuit 131 are taken in a register RE1 connected to the reading circuit 131. Meanwhile, the flip-flop FF3 is set by the negative edge of the pulse from the terminal ⑩, and thus, the gate of an AND circuit AN5 inserted between the flip-flop FF3 and the counter CO3 and the gate of an AND circuit AN8 connected between the counter CO3 and OR circuit OR5 are opened.

The setting of the flip-flop FF3 indicates that the data of the code perforation holes SH are read, and thereafter, sprocket hole signals are input to the trinary counter CO3, and a third sprocket hole signal is output from the carry terminal "CY" of the counter CO3 so as to be fed to the circuit of FIG. 12 through the AND circuit AN8 and OR circuits OR5 and OR6 connected to said counter CO3 for suspension of the film idle feeding and setting of the flip-flop FF5. In the above state, the film is stopped in such a position that the initial film frame F1 in FIG. 9(a) is stopped exactly at the position of the photographing frame of the camera (as indicated by the numeral 25 in FIG. 10(c)), while the code perforation detecting contact piece 95 and sprocket hole detecting contact piece 39 (FIG. 10) are located at approximately an intermediate position between the first and second sprocket holes PH for the first frame F1.

Upon completion of the exposure control function, the film winding-up is effected in the similar manner as described earlier, and the winding-up function is suspended based on the sprocket hole signal from the octal counter CO1. Since the gate of the AND circuit AN14 is opened by the setting of the flip-flop FF3, the sprocket hole signal from the AND circuit AN9 is applied to the clock terminals "CL" of both of the down counter CO4 and up counter CO5, and "one" is subtracted from the down counter CO4, while "one" is added to the up counter CO5. In the above state, since the flip-flop FF3 is set, one input terminal of the NAND circuit NA1 is "High". When the change-over switch S8 is connected to the terminal "l", the output of the NAND circuit NA1 is "High", and by the data selector 135, the indication based on the data from the up counter CO5, i.e. the indication of the number of frames exposed is effected at the indicating portion 139. Meanwhile, when the switch S8 is connected to the terminal "m", both of the two inputs for the NAND circuit NA1 are made "High", with the output thereof becoming "Low", whereby the data from the down counter CO4 are output from the data selector 135 so as to be fed to the indicating portion 139 through the decoder 137. Accordingly, the number of remaining frames to be exposed is indicated at the indicating portion 139.

Upon winding up to the last frame Fn of the film, the code perforation hole WH located at the position of the last frame Fn is detected, and the detection signal thereby is fed to the flip-flop FF6 through an AND circuit AN10 connected thereto for setting of said flip-flop FF6, whereby the terminal "u" is made "High", with the output of the OR circuit OR0 (FIG. 12) becoming "High", while the switch S1 is closed, since the charging of the exposure control mechanism is effected at this time, and the output of the inverter IN1 is "High", with the output of the AND circuit AN3 rising to be "High". By the above function, the "High" pulse is output from the one shot circuit OS3 to suspend the winding-up function. In the above case, since the signal for suspending the winding-up is simultaneously developed from the terminal "e", there is no adverse effect to the normal functioning of the arrangement.

Upon completion of the exposure control function at the last frame Fn, the motor M1 starts rotation in the similar manner as described previously for first charging the exposure control mechanism, and when the switch S1 is closed, since the terminal "u" is "High", the output of the AND circuit AN3 rises to "High", with the rotation of the motor M1 suspended. In other words, winding-up of the film is not effected. Meanwhile, in FIG. 13, when the output of the inverter IN9 is made "High" upon completion of the exposure control function, the output of an AND circuit AN11 coupled thereto becomes "High", and a timer TI3 inserted between the AND circuit AN11 and OR circuit OR7 starts functioning by the positive edge signal of the AND circuit AN11. Subsequently, after a sufficient time to effect the charging, one "High" pulse is developed from the timer TI3 so as to be fed into the one-shot circuit OS4 through the OR circuit OR7, and by the functioning of the one-shot shot circuit OS4, the rewinding is effected, with the rewinding function being thereafter suspended in the similar manner as described earlier. The lines leading to the terminals "g", "u" and "i" are respectively grounded by the resistors R4, R5 and R6 so as to keep the signals at the "Low" when the circuit 111 is not energized.

Figure 14:
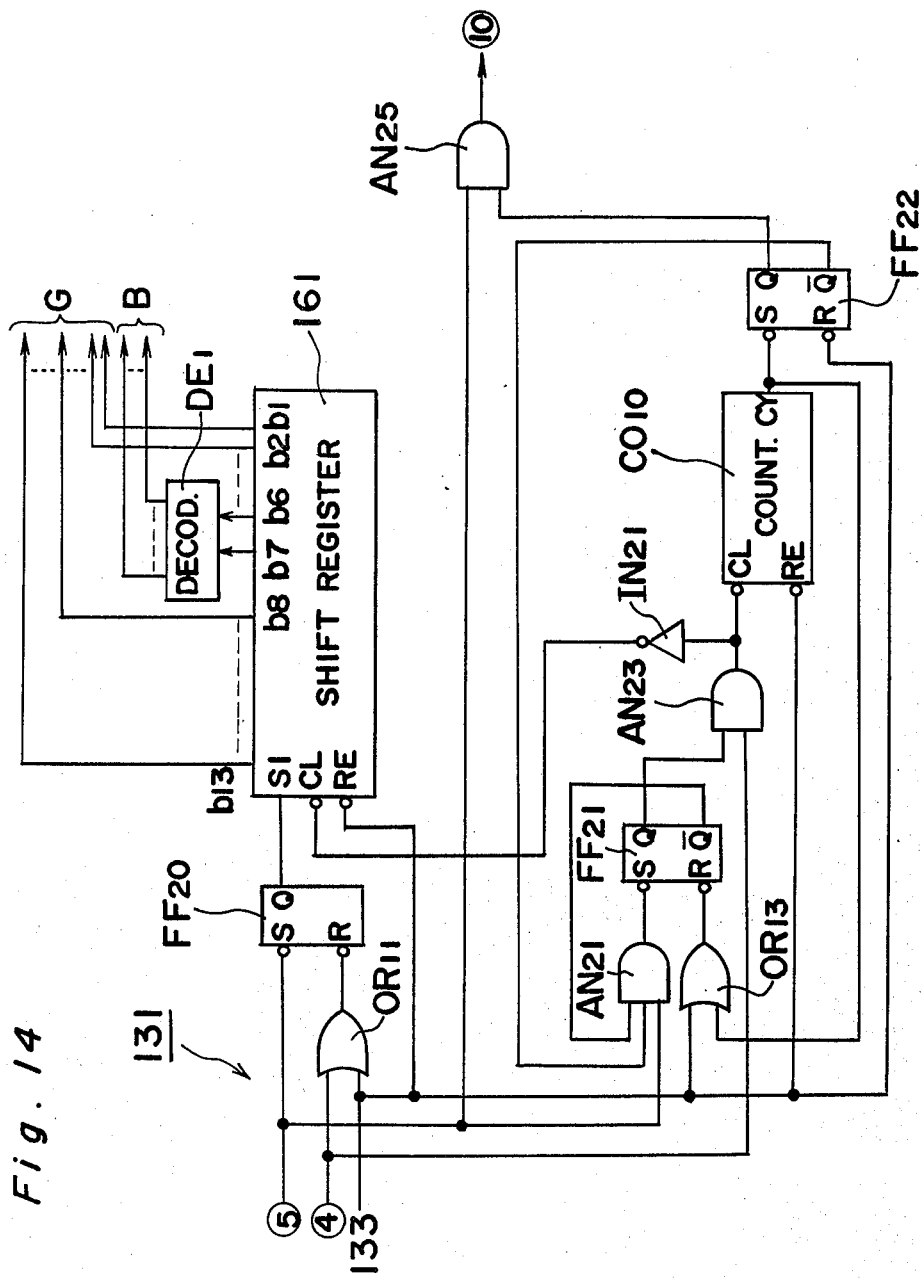
FIG. 14 is an electrical schematic specifically showing the circuit construction of a block 131 employed in the diagram of FIG. 13.

Referring also to FIG. 14 showing a specific construction of the reading circuit 131 in FIG. 13, upon starting of energization of said circuit 131, flip-flops FF20, FF21 and FF22, a shift register 161 and a counter CO10 included in the circuit 131 are reset by the pulses from the power-on reset circuit 133, and when the pulse based on the code perforation IH in FIG. 9(a) is input from the terminal ⑤, the flip-flop FF21 is set through an AND circuit AN21 to open the gate of an AND circuit AN23 connected between the flip-flop FF21 and the counter CO10, and thereafter, pulses based on the sprocket hole PH from the terminal ④ are output. Meanwhile, the flip-flop FF20 is set by the pulse based on the code perforation SH from the terminal ⑤ and reset by the pulse based on the sprocket hole PH from the terminal ④ through an OR circuit OR11. The output of the flip-flop FF20 is successively taken into the shift resistor 161 on the basis of signals obtained through inversion of the pulses from the AND circuit AN23 by an inverter IN21 inserted between the junction of the AND circuit AN23 and the counter CO10, and the shift register 161. The shift register 161 is arranged to input the "High" signal of the flip-flop FF20 in the presence of the code perforation SH between the sprocket holes PH, and the "Low" signal thereof in the absence of such code perforation SH between the sprocket holes PH for sequential shifting towards the right in FIG. 14, i.e. from the terminal "b13" towards the terminal "b1".

Meanwhile, the pulses from the AND circuit AN23 are applied to the quadradecimal counter CO10, and when the fourteenth pulse is developed from the carry terminal "CY" thereof, the flip-flop FF22 connected thereto is set to open the gate of an AND circuit AN25 coupled to the flip-flop FF22, while the flip-flop FF21 is reset through an OR circuit OR13, with the gate of the AND circuit AN23 closed, and thereafter, no pulses are developed from the AND circuit AN23, and thus, intake of the data based on the code perforation SH into the shift register 161 is suspended. Accordingly, in the above state, the output of the shift register at the terminals "b1" to "b13" is represented by "1100110111010" in the case of FIG. 9(a), and the pulse based on the code perforation EH is produced from the terminal ⑩ through the AND circuit AN25. By the above pulse, the data G from the terminals "b1" to "b5" and "b8" to "b13" are taken into the register RE1 (FIG. 13) for being memorized as stated earlier, while data B obtained by converting the data of the terminals "b6" and "b7" into binary data of the number of frames photographed by a decoder DE1 coupled to said terminals "b6" and "b7" are preset in the down-counter CO4 (FIG. 13).

It is to be noted here that the above arrangement may be so modified that, instead of employing the detection signal of the code perforation WH for detecting starting of the film rewinding, the rewinding is started through detection that the output data of the down counter CO4 have become zero.

Figure 15:
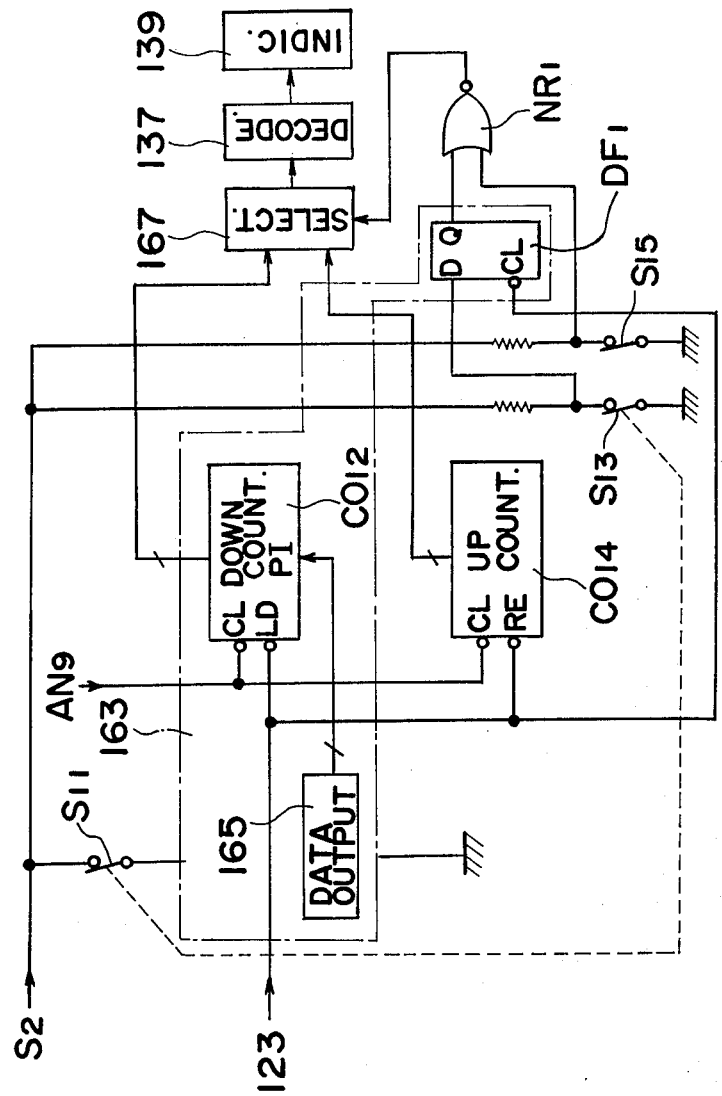
FIG. 15 is an electrical schematic showing a modification of a film counter portion of FIG. 13.

Referring further to FIG. 15, there is shown a circuit arrangement in which indications may be changed over between the remaining number of frames to be photographed and the number of frames already exposed even with respect to a film without provision of the code perforation SH. In the circuit of FIG. 15, the line from the switch S2 is connected to a circuit 163 surrounded by the one dot chain lines through a power supply switch S11 which is arranged to be manually changed over, and also to the ground through a resistor and a switch S13 which is opened or closed in association with the switch S11 and through a resistor and another switch S15 for changing over the contents for indications. In the circuit 163, there is provided a data output circuit 165 for producing binary data of the number of frames exposed, which data are to be set manually. Upon closing of the back cover, with the switches S11 and S13 closed, power is fed through the switch S2 (FIG. 12), and based on the reset pulses from the power-on reset circuit 123 (FIG. 13), the data from the data output circuit 165 are preset in a down counter CO12 coupled to said circuit 165, and an up counter CO14 is reset. Meanwhile, in a D-flip-flop DF1 coupled to the switch S13, a "Low" signal is latched if the switch S13 is closed, while a "High" signal is latched if the switch S13 is opened, on the basis of the reset pulses.

When the Q output of the D-flip-flop DF1 is "Low", if the switch 15 is kept closed, the output of a NOR circuit NR1 connected to said Q output is "High", and the data from the down counter CO12 are produced from a data selector 167, and the remaining number of frames to be exposed is displayed in the indication section 139 through the decoder 137. When the Q output of the D-flip-flop DF1 is "High", or in the case where the switch S15 is kept opened, the output of the NOR circuit NR1 becomes "Low", and the data from the up counter CO14 are output from the data selector 167, with the number of frames exposed being indicated at the indication section 139.

In the case of the first embodiment according to the present invention, although the two detecting portions are not arranged to detect the sprocket holes simultaneously, if the detecting portions are arranged in such a manner, there is a problem that a large space is occupied thereby in the direction for feeding the film. Meanwhile, in the case of the detecting portions as shown in FIGS. 4(a), 4(b) and 4(c), chattering takes place only at the beginning and ending of the detecting signal, with the intermediate portion therebetween being stable.

Figure 16:
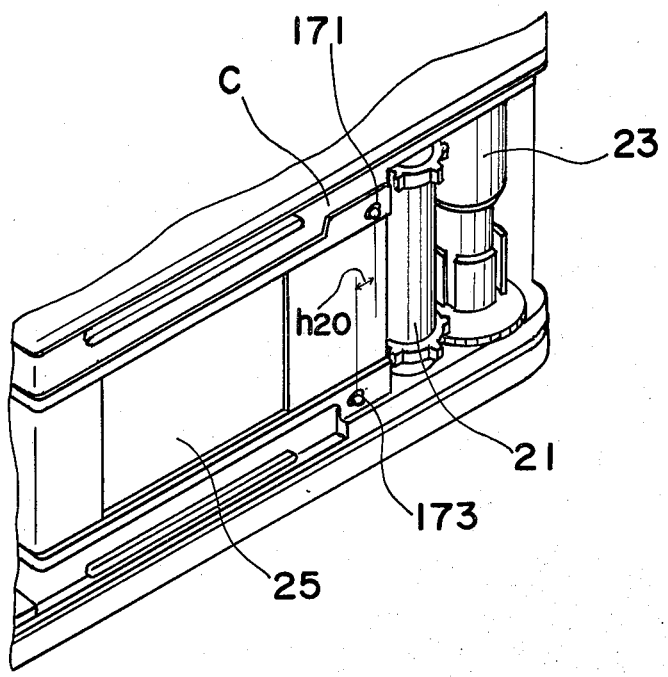
FIG. 16 is a fragmentary perspective view at a rear portion of a photographic camera to which a detecting arrangement according to a second embodiment of the present invention is applied.
Figure 17:
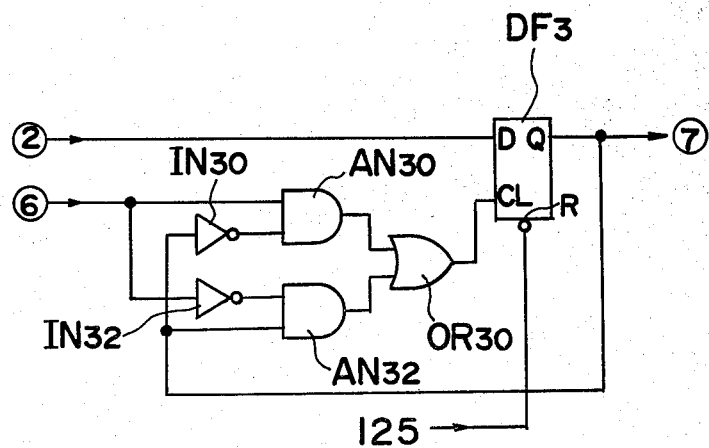
FIG. 17 is a fragmentary circuit diagram showing an essential construction of the detecting arrangement of FIG. 16.
Figure 18:
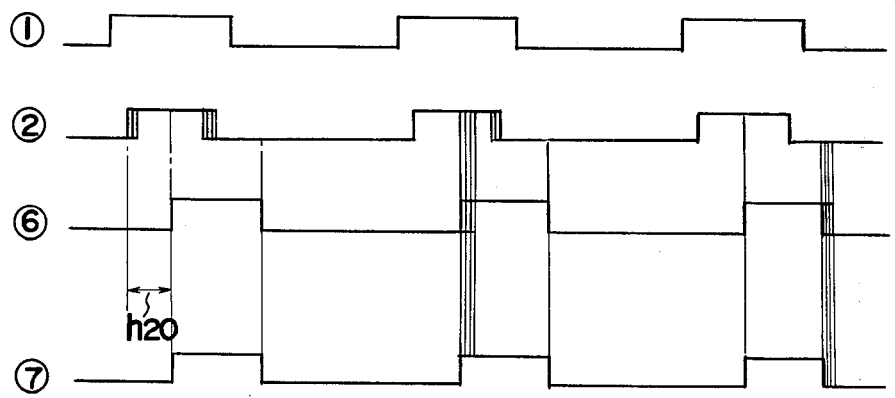
FIG. 18 is a time chart explanatory of the functions of the detecting arrangement of FIGS. 16 and 17.

Reference is made to FIGS. 16, 17 and 18 showing a second embodiment of the present invention in which the space to be occupied by the detecting portions in the film feeding direction is reduced through utilization of the fact as described above.

In FIG. 16, pins 173 and 171 are arranged to have similar mechanisms as the pins 9 and 5 in FIGS. 4(a), 4(b) and 4(c), with the detailed description thereof being abbreviated for brevity. The pin 173 is disposed at a position of the camera body C below the photographing frame 25 and adjacent to the lower portion of the sprocket 21. The distance h20 between the pins 173 and 171 is set to be, for example, 0.75 mm, and thus, the detection signal ② by the pin 171 and the detection signal ⑥ by the pin 173 are arranged to be produced through deviation by h20=0.75 mm, as is understood from FIG. 18. Therefore, the signal ② is stabilized in "High" and "Low" states at the moments corresponding to the positive edge and negative edge of the signal ⑥, respectively.

In the circuit arrangement of FIG. 17, the signal ② is input to the D input of a D-flip-flop DF3 connected to the line for the signal ②, and reset by the reset signal from the power-on reset circuit 125 in FIG. 13. When a signal ⑦ from the Q output of the D-flip-flop DF3 is "Low", the gate of an AND circuit AN30 connected to said Q output through an inverter IN30 is opened by said inverter IN30, and the signal ⑥ is applied to the clock terminal "CL" of the D-flip-flop DF3 through an OR circuit OR30 so as to take in the signal ② by the positive edge of the above signal, thus the Q output ⑦ being made "High" (FIG. 18-⑦). When the signal ⑦ becomes "High", the gate of an AND circuit AN32 connected to the Q output of the flip-flop DF3, and to the line for signal ⑥ through an inverter IN32 is opened, and the signal obtained by inverting the signal ⑥ through the inverter IN32 is applied to the clock terminal "CL" of the D-flip-flop DF3 through the OR circuit OR30. Accordingly, upon negative edge of the signal ⑥, the clock terminal "CL" rises and the D-flip-flop DF3 takes in the signal ②, with the Q output thereof made "Low". Meanwhile, when the signal ⑥ is subjected to the chattering, the signal ② may be taken in by a large number of times, but in the above case, since the signal ② is in the state of "High" or "Low"., the signal for ⑦ also remains in the state of "high" or "Low". Accordingly, if the signal ⑦ is employed as the signal for sprocket holes, the sprocket hole signals unaffected by the chattering may be obtained.

Figure 19:
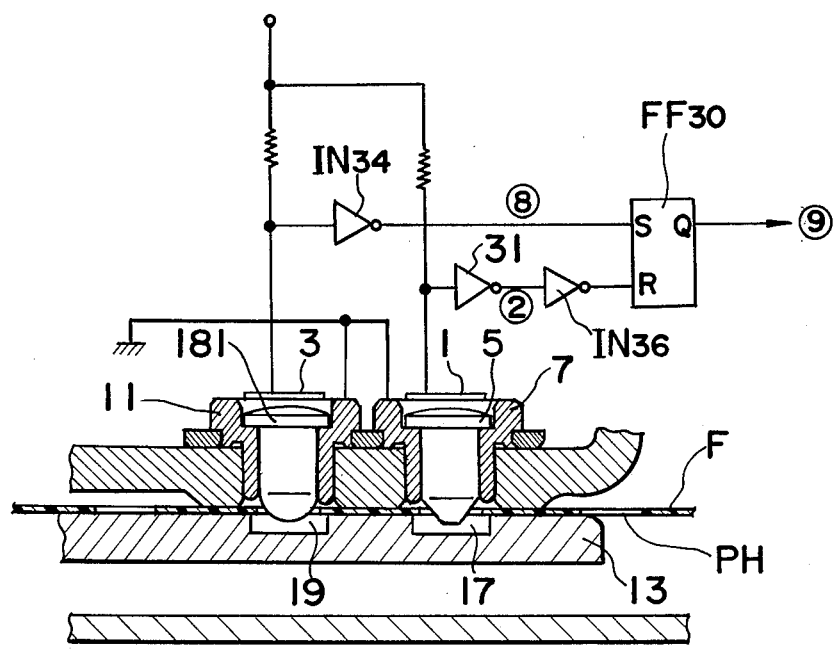
FIG. 19 is a fragmentary side sectional view of a photographic camera to which a detecting arrangement according to a third embodiment of the present invention is applied, with a schematic representation of electrical connections thereto.
Figure 20:
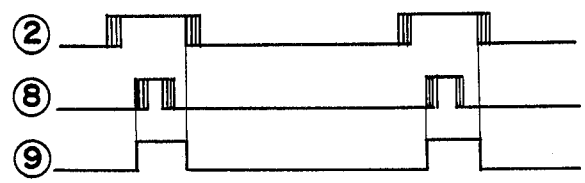
FIG. 20 is a time chart explanatory of functions of the arrangement of FIG. 19.

Referring to FIGS. 19 and 20 showing a third embodiment of the detecting arrangement according to the present invention, there are provided detecting pins 5 and 181 which have end portions different in configuration from each other as compared with the pins 9 and 5 in FIGS. 4(a) to 4(c). The period in which the end portion of the pin 5 extends through the sprocket hole, with the contact piece 1 contacting the contact seat 7, is arranged to be longer than the period in which the end portion of the pin 181 extends through the sprocket hole, with the contact piece 3 contacting the contact seat 11. Furthermore, since the positions for the pins 5 and 181 are separated by an amount equivalent to one period for the sprocket holes, signals in the same phase are produced from the two detecting portions. The output ② of the inverter 31 and the output ⑧ of the inverter IN34 are produced in the relation as shown in FIG. 20, and at the moment corresponding to the positive edge of the signal for ⑧, the signal ② is stable in the "High" state, while at the moment corresponding to the negative edge of the signal ②, the signal ⑧ is stabilized in the "Low " state. Therefore, after being set by the positive edge of the signal ⑧, the flip-flop FF30 maintains its set state until the negative edge of the signal ②, and upon resetting of the flip-flop FF30 through the inverter IN36 at the negative edge of the signal ②, the state is maintained until the positive edge of the signal ⑧. In other words, the Q output (signal ⑨) of the flip-flop FF30 represents the sprocket hole signal unaffected by the chattering.

It should be noted here that, for reading, at the side of a photographic camera, the information for the number of available film frames, which is imparted to a film to be loaded into the photographic camera, there may be employed, for example, an arrangement as described hereinbelow with reference to FIGS. 21, 22 and 23, besides the practice for providing the code perforations in the film surface as described in the foregoing.

Figure 21:
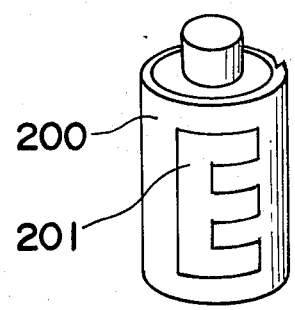
FIG. 21 is a perspective view of a film container or cartridge having an electrically conductive code pattern provided on its outer wall for film information.
Figure 22:
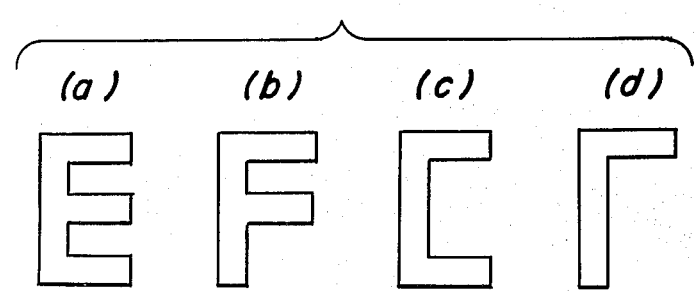
FIG. 22 represents diagrams showing various configurations of code patterns which may correspond to the number of frames to be exposed for photographing.

More specifically, FIG. 21 shows one example of an arrangement in which an electrically conductive code pattern 201 is provided on an external wall of a film container or cartridge 200, while FIGS. 22(a) to 22(d) represent examples of code pattern configurations corresponding to the number of available film frames, which can be exposed, for example, 36 exposures, 24 exposures, 20 exposures and 12 exposures respectively.

Any one of the code patterns as described above may be provided on the external wall of the catridge 200 according to the length of the film contained in the cartridge, while contact pieces (to be described later) are provided at the side of the photographic camera so as to contact the code pattern of the film cartridge 200 for reading the number of frames to be exposed thereby.

Figure 23:
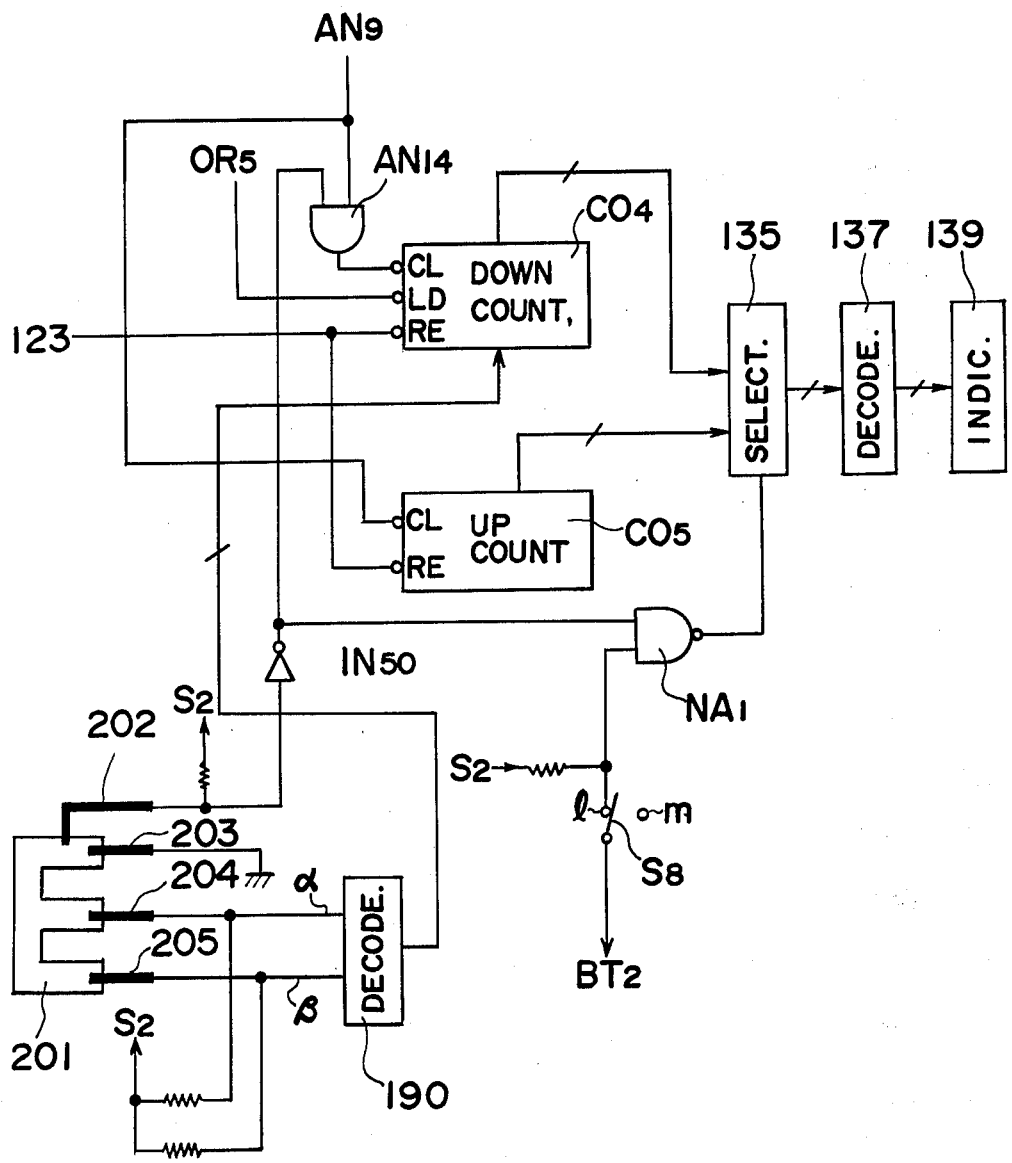
FIG. 23 is an electrical schematic to be incorporated at the side of a photographic camera for dealing with the code patterns as shown in FIGS. 21 and 22.

In FIG. 23, there is shown one embodiment of a circuit construction to be provided at the side of the photographic camera and arranged to effect the functions as described above. Since the circuit of FIG. 23 may be fundamentally understood in the similar manner as in the circuit of FIG. 13, only the main portion thereof is shown, and like parts in FIG. 13 are designated by like reference numerals in FIG. 23, with detailed description thereof abbreviated for brevity. In FIG. 23, the AND circuit AN9, OR circuit OR5 and circuit 123 are respectively coupled to the portions having the corresponding numerals in FIG. 13. In the arrangement of FIG. 23, contact pieces 202, 203, 204 and 205 for contacting the code pattern 201 as in FIG. 21 are provided. The contact piece 202 is connected to the switch S2 through a resistor and to the clock terminal "CL" of the counter CO4 through an inverter IN50 and an AND circuit AN14, and the contact piece 203 is suitably grounded. The contact pieces 204 and 205 are also coupled to the counter CO4 through a decoder 190 and to the switch S2 through suitable resistors. The output α of the contact piece 204 and the output β of the contact piece 205 will be as shown in the Table below.

|  | α | β |
|---|---|---|
| (a) 36 exposures | 0 | 0 |
| (b) 24 exposures | 0 | 1 |
| (c) 20 exposures | 1 | 0 |
| (d) 12 exposures | 1 | 1 |

In connection with the above, since conduction is established between the contact pieces 202 and 203 by any of the patterns of FIGS. 22(a), 22(b), 22(c) and 22(d), the output of the inverter IN50 is "High" in any of the above cases.

Conversely, when a film cartridge having no code pattern is loaded into the photographic camera, conduction is not established between the contact pieces 202 and 203, and therefore, the output of the inverter IN50 is "Low". Accordingly, from the output of the inverter IN50, cartridges with and without the code patterns may be identified.

In the case where the output of the inverter IN50 is "Low", with a film cartridge without a code pattern being in the photographic camera, the output of the up counter CO5 is selected by the selector 135 for indication by the indicator 139. The up counter CO5 has a similar function as that in FIG. 13.

Meanwhile, when the output of the inverter IN50 becomes "High" and the switch S8 is connected to its terminal "m", with a film cartridge having a code pattern being loaded into the photographic camera, the output of the NAND circuit NA1 becomes "Low", and therefore, the selector 135 is brought into the state for selecting the output of the down counter CO4. The decoder 190 decodes the outputs α and β from the contact pieces 204 and 205, and its output is preset in the down counter CO4 by the film idle feeding stopping signal from the OR circuit OR5 having a similar function to that in FIG. 13. Thereafter, the down counter CO4 functions exactly in the same manner as described with reference to FIG. 13.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In a camera capable of functioning in accordance with information received from a roll of film to be loaded in the camera, a sprocket hole detecting device comprising:
    first and second detector means for generating a respective first electric signal and a second electric signal each changing between a first state and a second state in response to respective passages of the sprocket holes of the film during the winding-up motion thereof, a time lag being provided between the change in the first electric signal and the change in the second electric signal, said first and second detectors operating such that the second signal changes from said first to second state and changes from said second state back to said first state within the period defined between the change in said first signal from said first to second state and the change from said second state back to said first state; and means for forming a sprocket hole signal indicative of the passage of sprocket holes in response to said first and second electric signals.

2. In a camera as in claim 1, wherein said forming means comprises means for shaping said sprocket hole signal to change from a first state to a second state in response to the change in a predetermined one of said first and second electric signals, and to change from said second state back to said first state in response to the change in the other of said first and second electric signals.

3. In a camera capable of functioning in accordance with information received from a roll of film to be loaded in the camera, a film rewinding device comprising:
means for reading code perforations formed on the film to be loaded in the camera;
means for automatically rewinding the film after the available frames are all exposed;
first means for actuating said rewinding means in response to said reading means with a code perforation located at the last frame; and
second means for actuating said rewinding means with the film incapable of being further wound-up.

4. A camera as in claim 3, wherein said second actuating means includes means for forming a sprocket hole signal changing in response to respective passages of the sprocket holes of film during the winding-up motion thereof, means for counting the change in said sprocket hole signal, and means for sensing that the film is incapable of being further wound-up with a predetermined number of changes in said sprocket hole signal not counted by said counting means within a given period of time.

5. In a camera capable of functioning in accordance with information received from a roll of film to be loaded in the camera, a device for switching between a plurality of modes of operation of the camera:
means for generating a first electric signal and a second electric signal each changing between a first state and a second state in response to respective passages of the sprocket holes of the film during the winding-up motion thereof, a time lag being provided between the change in the first electric signal and the change in the second electric signal;
means for forming a sprocket hole signal indicative of the passage of sprocket holes in response to said first and second electric signals;
means for counting the changes in said sprocket hole signal;
means for detecting a code from the roll of film to be loaded in the camera;
means responsive to said detecting means for determining whether the loaded roll of film is of a type provided with or without the code before the loaded film is wound-up to the first frame thereof; and
means responsive to said determining means for switching the camera between a first mode of operation responsive to film information based on both said counting means and said detecting means and a second mode of operation responsive to film information based on only said counting means.

6. In a camera capable of functioning in accordance with information received from a roll of film to be loaded in the camera, a frame number indicating device comprising:
means for forming a sprocket hole signal changing in response to respective passages of the sprocket holes of film during the winding-up motion thereof;
means for counting the changes in said sprocket hole signal;
means for detecting coded information from the roll of film by reading coded perforations on the film surface;
means responsive to said detecting means for determining whether the film is of a type provided with or without the coded information before the film is wound-up to the first frame thereof;
means responsive to said determining means for switching the camera between a first mode of operation responsive to film information based on the operation of both said counting means and said detecting means and a second mode of operation responsive to film information based on only the operation of said counting means, said counting means comprising a downcounter to be automatically preset with the number of available frames of the loaded film in response to the operation of said detecting means before the film is wound-up to the first frame thereof and an up-counter; and
a frame number indicator responsive to the operation of one of said down-counter and up-counter selected by said switching means.

7. In a camera capable of functioning in accordance with information received from a roll of film to be loaded in the camera, a frame number indicating device comprising:
means for forming a sprocket hole signal changing in response to respective passages of the sprocket holes of film during the winding-up motion thereof;
means for counting the changes in said sprocket hole signal;
means for detecting coded information formed on the film cartridge of the roll of film;
means responsive to said detecting means for determining whether the film is of a type provided with or without the coded information before the loaded film is wound-up to the first frame thereof;
means responsive to said determining means for switching the camera between a first mode of operation responsive to film information based on the operation of both said counting means and said detecting means and a second mode of operation responsive to film information based on the operation of only said counting means, said counting means comprising a down-counter to be automatically preset with the number of available frames of the loaded film in response to the operation of said detecting means before the film is wound-up to the first frame and an up-counter; and
a frame number indicator responsive to the operation of one of said down-counter and up-counter selected by said switching means.

8. In a camera capable of functioning in accordance with information received from a roll of film to be loaded in the camera, a film wind-up device comprising:
means for forming a sprocket hole signal changing in response to respective passages of the sprocket holes of film during the winding-up motion thereof;
means for counting the changes in said sprocket hole signal;
means for detecting coded information from the roll of film by reading coded perforations formed on the film surface;

means responsive to said detecting means for determining whether the film is of a type provided with or without the coded information before the film is wound-up to the first frame thereof;

means responsive to said detecting means for switching the camera between a first mode of operation responsive to film information based on the operation of both said counting means and said detecting means and a second mode of operation responsive to film information based on only the operation of said counting means;

means for automatically winding-up the film to the first frame thereof;

first means responsive to said reading means for stopping said winding-up means with a coded perforation located at the first frame; and second means responsive to said counting means for stopping said winding-up means with a predetermined number of changes in said sprocket hole signal counted, wherein one of said first and second stopping means is selected by said switching means.

9. In a camera capable of functioning in accordance with information received from a roll of film to be loaded in the camera, a film rewinding device comprising:

means for forming a sprocket hole signal changing in response to respective passages of the sprocket holes of film during the winding-up motion thereof;

means for counting the changes in said sprocket hole signal;

means for detecting coded information from the roll of film by reading coded perforations formed on the film surface;

means responsive to said detecting means for determining whether the film is of a type provided with or without the coded information before the film is wound-up to the first frame thereof;

means responsive to said detecting means for switching the camera between a first mode of operation responsive to film information based on the operation of both said counting means and said detecting means and a second mode of operation responsive to film information based on only the operation of said counting means;

means for automatically re-winding the film after the available frames are all exposed;

first means responsive to said reading means for actuating said re-winding means with a coded perforation located at the last frame; and second means responsive to said counting means for actuating said re-winding means with a predetermined number of changes in said sprocket hole signal not counted within a given period of time, wherein one of said first and second stopping means is selected by said switching means.

10. In a camera capable of functioning in accordance with information received from a roll of film to be loaded in the camera, a frame number indicating device comprising:

means for forming a film movement signal changing in response to the movement of film during the winding-up motion thereof;

means for counting the changes in said film movement signal;

means for detecting coded information received from the roll of film to be loaded in the camera;

means responsive to said detecting means for determining whether the film is of a type provided with or without the coded information before the loaded film is wound-up to the first frame thereof;

means responsive to said determining means for switching the camera between a first mode of frame number indicating operation responsive to both said film movement signal and said coded information and a second mode of frame number indicating operation responsive to only said film movement signal, said counting means comprising a downcounter, effective in said first mode, to be automatically preset with the number of available frames of the loaded film in response to the operation of said detecting means before the film is wound-up to the first frame and an up-counter effective in said second mode; and a frame number indicator responsive to the operation of one of said down-counter and up-counter selected by said switching means.

11. A camera as in claim 10, wherein said detecting means comprises means for responding to the coded information formed on the film cartridge of the roll of film.

12. A camera as in claim 10, wherein said detecting means comprises means for responding to the coded information formed on the film surface.

13. In a camera capable of functioning in accordance with information received from a roll of film to be loaded in the camera, a frame number indicating device comprising:

means for forming a film movement signal changing in response to the movement of film during the winding-up motion thereof;

means for counting the changes in said film movement signal;

means for detecting coded information received from the roll of film to be loaded in the camera;

means responsive to a manual operation for switching the camera between a first mode of frame number indicating operation responsive to both said film movement signal and said coded information and a second mode of frame number indicating operation responsive to only said film movement signal, said counting means comprising a down-counter, effective in said first mode, to be automatically preset with the number of available frames of the loaded film in response to the operation of said detecting means before the film is wound-up to the first frame and an up-counter effective in said second mode; and a frame number indicator responsive to the operation of one of said down-counter and up-counter selected by said switching means.

14. A camera as in claim 13, wherein said detecting means comprises means for responding to the coded information formed on the film cartridge of the roll of film.

15. In a camera capable of functioning in accordance with information received from a roll of film to be loaded in the camera, a film rewinding device comprising:

means for forming a film movement signal changing in response to the movement of film during the winding-up motion thereof;

a down-counter for counting the changes in said film movement signal;

means for detecting coded information received from the roll of film to be loaded in the camera;

means responsive to said detecting means for automatically presetting said down-counter with the number of available frames of the loaded film before the film is wound-up to the first frame;

means for automatically rewinding the film after the available frames are all exposed;

first means for actuating said rewinding means when said down-counter represents that no available frame remains; and second means for actuating said rewinding means with the film incapable of being further wound-up.

16. A camera as in claim 15, wherein said detecting means comprises means for responding to the coded information formed on the film cartridge of the roll of film.

* * * * *